United States Patent
Shah et al.

(10) Patent No.: US 12,107,673 B2
(45) Date of Patent: Oct. 1, 2024

(54) JAMMER DETECTION SYSTEM

(71) Applicant: QUALCOMM Incorporated, San Diego, CA (US)

(72) Inventors: Peter Shah, San Diego, CA (US); Ajay Devadatta Kanetkar, San Diego, CA (US); Siavash Ekbatani, San Diego, CA (US); Yuanning Yu, Santa Clara, CA (US); Shrenik Patel, San Diego, CA (US); Dongjiang Qiao, San Diego, CA (US); Rajagopalan Rangarajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/468,281

(22) Filed: Sep. 7, 2021

(65) Prior Publication Data

US 2023/0073817 A1 Mar. 9, 2023

(51) Int. Cl.
*H04K 3/00* (2006.01)
*H04B 17/318* (2015.01)

(52) U.S. Cl.
CPC .............. *H04K 3/22* (2013.01); *H04B 17/318* (2015.01); *H04K 3/45* (2013.01)

(58) Field of Classification Search
None
See application file for complete search history.

(56) References Cited

U.S. PATENT DOCUMENTS

| | | | | |
|---|---|---|---|---|
| 5,602,994 A | * | 2/1997 | Ferron | G06F 13/4018 710/14 |
| 5,739,969 A | * | 4/1998 | Garza | G11B 5/09 |
| 6,678,478 B1 | * | 1/2004 | Ono | H04B 10/504 398/24 |

(Continued)

FOREIGN PATENT DOCUMENTS

| | | | | |
|---|---|---|---|---|
| CN | 106550395 A | * | 3/2017 | H04B 17/318 |
| CN | 110927682 A | * | 3/2020 | G01S 7/36 |

(Continued)

OTHER PUBLICATIONS

International Search Report and Written Opinion—PCT/US2022/040296—ISA/EPO—Feb. 16, 2023.

(Continued)

*Primary Examiner* — Gennadiy Tsvey
(74) *Attorney, Agent, or Firm* — Patterson & Sheridan LLP

(57) ABSTRACT

Certain aspects of the present disclosure generally relate to jamming detection for radio frequency (RF) front-end circuitry. For example, certain aspects provide an apparatus having a first counter configured to count a number of times that a power of a reception signal exceeds a first threshold. The apparatus also includes a second counter configured to count a number of measurements of the power of the reception signal. The apparatus further includes control logic having a first input coupled to an output of the first counter and having a second input coupled to an output of the second counter. The control logic is configured to determine an amount of jamming over a measurement (Continued)

window based on the number of times that the power of the reception signal exceeds the first threshold and on the number of measurements.

29 Claims, 10 Drawing Sheets

(56) References Cited

U.S. PATENT DOCUMENTS

| | | | | |
|---|---|---|---|---|
| 8,369,467 B2* | 2/2013 | Kajakine | ............ | H03G 3/3068 375/345 |
| 8,417,203 B2* | 4/2013 | Saito | .................... | H03G 3/3052 455/234.1 |
| 10,230,345 B1* | 3/2019 | Arslan | ................. | H04B 1/0007 |
| 10,523,251 B1* | 12/2019 | Coban | ................. | H04B 17/318 |
| 2002/0042256 A1 | 4/2002 | Baldwin et al. | | |
| 2003/0078007 A1* | 4/2003 | Parssinen | ................. | H04B 1/10 455/67.11 |
| 2006/0222116 A1* | 10/2006 | Hughes | ................ | H03G 3/3078 375/345 |
| 2007/0110193 A1* | 5/2007 | Solum | .................... | H04B 1/109 375/345 |
| 2009/0258624 A1* | 10/2009 | Gudem | .................. | H03F 3/245 455/234.1 |
| 2009/0291644 A1 | 11/2009 | Suwa et al. | | |
| 2010/0026547 A1* | 2/2010 | Weissman | ............ | H03G 3/3052 342/16 |
| 2010/0026549 A1 | 2/2010 | Weissman et al. | | |
| 2010/0119020 A1 | 5/2010 | Bhukania et al. | | |
| 2011/0206210 A1* | 8/2011 | Kurokawa | ............ | H04B 1/1661 381/2 |
| 2012/0288043 A1* | 11/2012 | Chen | ..................... | H04B 1/109 375/345 |
| 2012/0319774 A1* | 12/2012 | Ibrahim | ............... | H03G 3/3068 330/129 |
| 2013/0102267 A1* | 4/2013 | Haub | ................... | H04B 1/1036 455/296 |
| 2013/0195215 A1* | 8/2013 | Manglani | ............ | H03G 3/3068 375/295 |
| 2013/0217353 A1* | 8/2013 | Snider | .................... | B60R 25/30 455/404.2 |
| 2014/0133606 A1* | 5/2014 | Mochizuki | ........ | H04W 52/0245 375/340 |
| 2015/0124710 A1* | 5/2015 | Sun | ..................... | H04L 27/0008 370/329 |
| 2016/0227571 A1* | 8/2016 | Baek | ................. | H04W 52/0206 |
| 2016/0299182 A1* | 10/2016 | Tsukamoto | ........ | G01R 29/0814 |
| 2017/0052248 A1 | 2/2017 | Rezk et al. | | |
| 2018/0060162 A1* | 3/2018 | Qiang | ................. | G06F 11/1458 |
| 2020/0015236 A1* | 1/2020 | Kung | ....................... | H04B 7/04 |
| 2020/0245173 A1* | 7/2020 | Kusashima | ............ | H04B 17/24 |
| 2020/0371201 A1 | 11/2020 | Ladubec, Jr. | | |
| 2021/0337593 A1* | 10/2021 | Fujishiro | ............... | H04W 24/08 |

FOREIGN PATENT DOCUMENTS

| | | | | |
|---|---|---|---|---|
| CN | 112261661 A | * | 1/2021 | ............. H04B 17/26 |
| JP | 2011135161 A | * | 7/2011 | |
| WO | WO-2012050681 A2 | | 4/2012 | |
| WO | WO-2017135726 A1 | * | 8/2017 | ........... H04L 5/0044 |
| WO | WO-2020145000 A1 | * | 7/2020 | ............ H04W 16/14 |

OTHER PUBLICATIONS

Partial International Search Report—PCT/US2022/040296—ISA/EPO—Nov. 29, 2022.

* cited by examiner

JAMMER DETECTION SYSTEM

BACKGROUND

Field of the Disclosure

Certain aspects of the present disclosure generally relate to electronic circuits and, more particularly, to techniques and apparatus for performing jamming detection for radio frequency (RF) front-end circuitry.

Description of Related Art

Electronic devices include computing devices such as desktop computers, notebook computers, tablet computers, smartphones, wearable devices like a smartwatch, internet servers, and so forth. These various electronic devices provide information, entertainment, social interaction, security, safety, productivity, transportation, manufacturing, and other services to human users. These various electronic devices depend on wireless communications for many of their functions. Wireless communication systems and devices are widely deployed to provide various types of communication content such as voice, video, packet data, messaging, broadcast, and so on. These systems may be capable of supporting communication with multiple users by sharing the available system resources (e.g., time, frequency, and power). Examples of such systems include code division multiple access (CDMA) systems, time division multiple access (TDMA) systems, frequency division multiple access (FDMA) systems, and orthogonal frequency division multiple access (OFDMA) systems (e.g., a Long Term Evolution (LTE) system or a New Radio (NR) system).

A wireless communication network may include a number of base stations that can support communication for a number of mobile stations. A mobile station (MS) may communicate with a base station (BS) via a downlink and an uplink. The downlink (or forward link) refers to the communication link from the base station to the mobile station, and the uplink (or reverse link) refers to the communication link from the mobile station to the base station. A base station may transmit data and control information on the downlink to a mobile station and/or may receive data and control information on the uplink from the mobile station. The base station and/or mobile station may include RF front-end circuitry, which may be used for communication within a millimeter wave (mmW) communication band, for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide the advantages described herein.

Certain aspects of the present disclosure provide an apparatus for wireless communications. The apparatus generally includes: a first counter configured to count a number of times that a power of a reception signal exceeds a first threshold; a second counter configured to count a number of measurements of the power of the reception signal; and control logic having a first input coupled to an output of the first counter and having a second input coupled to an output of the second counter. The control logic is configured to determine an amount of jamming over a measurement window based on the number of times that the power of the reception signal exceeds the first threshold and on the number of measurements.

Certain aspects of the present disclosure provide a wireless device. The wireless device generally includes: an apparatus; at least one antenna; an analog-to-digital (ADC); and a receive path coupled between the at least one antenna and the ADC. The apparatus generally includes: a first counter configured to count a number of times that a power of a reception signal exceeds a first threshold; a second counter configured to count a number of measurements of the power of the reception signal; and control logic having a first input coupled to an output of the first counter and having a second input coupled to an output of the second counter. The control logic is configured to determine an amount of jamming over a measurement window based on the number of times that the power of the reception signal exceeds the first threshold and on the number of measurements. The receive path is configured to generate the reception signal.

Certain aspects of the present disclosure provide an apparatus for wireless communication. The apparatus generally includes a first power detector circuit coupled to a first receive path and to a second receive path. The first power detector circuit is configured to generate a control signal based on a relative power between: a first reception signal of the first receive path and associated with a first band; and a second reception signal of the second receive path and associated with a second band. The apparatus also includes a combiner circuit having a first input coupled to the first receive path and having a second input coupled to the second receive path. The combiner circuit is configured to combine the first reception signal and the second reception signal to a single IF path. The apparatus also includes a second power detector circuit coupled to the single IF path and configured to determine a combined power of the first and second reception signals. The apparatus also includes a first set of counters coupled to an output of the second power detector circuit and includes a second set of counters coupled to the output of the second power detector circuit. The first set of counters are associated with detecting a jamming of the first band, and the second set of counters are associated with detecting a jamming of the second band. The apparatus further includes a selection circuit configured to couple the output of the second power detector circuit to the first or second set of counters based on the control signal.

Certain aspects of the present disclosure provide a method for wireless communication. The method includes determining a power of a reception signal. The method also includes counting, with a first counter, a number of times that the power of the reception signal exceeds a first threshold. The method further includes counting, with a second counter, a number of measurements of the power of the reception signal. The method further includes determining an amount of jamming over a measurement window based on the number of times that the power of the reception signal exceeds the first threshold and on the number of measurements.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
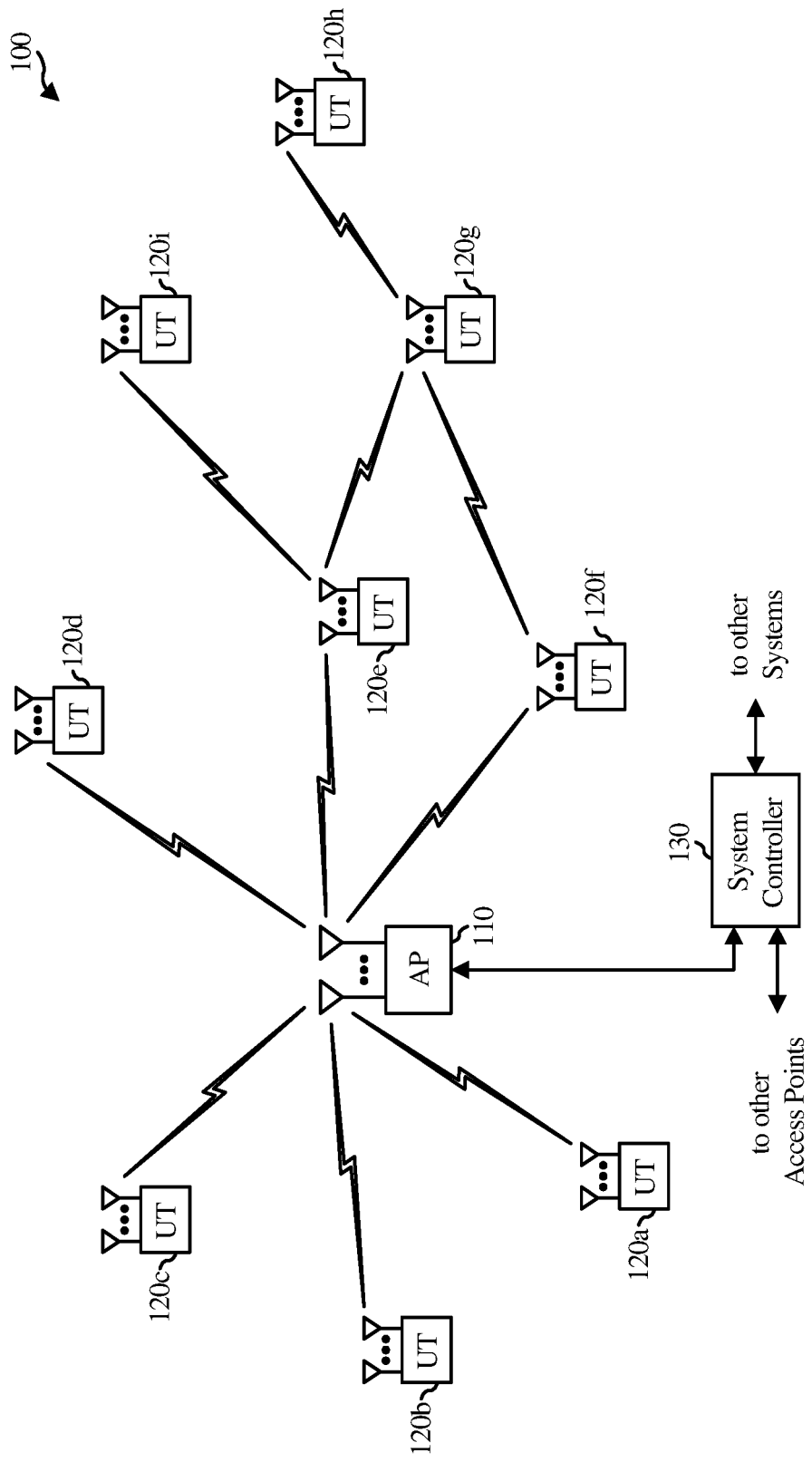
FIG. 1 is a diagram of an example wireless communications network, in accordance with certain aspects of the present disclosure.

Certain aspects of the present disclosure generally relate to techniques and apparatus for detecting jamming of RF front-end circuitry. In some cases, for example, there may be strong jamming signals outside of the baseband filter bandwidth of the receive (RX) chain of a communications device. The jamming signals may be caused, for example, by radio emissions in nearby bands, intentional or unintentional jamming, naturally occurring phenomena, etc. In conventional RF front-end circuitry, the jamming signals (outside of the baseband filter bandwidth) may be attenuated in the analog-to-digital converter (ADC) output and, therefore, may not be detected by the automatic gain control (AGC) logic. Consequently, the jamming signals may saturate the RX chain of the communications device.

To address this, certain aspects described herein may employ a jamming detection circuit prior to the analog baseband filter. Using the jamming detection circuit prior to the analog baseband filter can enable the AGC logic to account for the jamming information (in the receive signal) that would have otherwise been suppressed in the baseband filter. In some aspects, the jamming detection circuit can include: (i) circuitry for determining the power of the received analog signal and (ii) at least two counters for determining an amount of jamming that occurs for the received analog signal. As described in more detail below, a first counter can be used to count the number of measurements of the power of the analog signal (e.g., measurement counter value), and a second counter can be used to count the instances in which the power of the analog signal exceeds a threshold (e.g., jamming event counter value). The jamming detection circuit can determine the amount of jamming that occurs over a measurement window by dividing the jamming event counter value by the measurement counter value.

The jamming detection circuit can generate a logic signal to trigger, via AGC logic, an adjustment of the analog gain based on whether the amount of jamming that occurs exceeds a first threshold (or the amount of jamming is below a second threshold). For example, if the amount of jamming exceeds the first threshold (e.g., an amount of time that jamming occurs exceeds a first threshold amount of time, a frequency of the jamming exceeds a first threshold frequency, etc.), then the jamming detection circuit can generate a logic signal that triggers a reduction of the analog gain. On the other hand, if the amount of jamming is below the second threshold, then the jamming detection circuit can generate a logic signal that triggers an increase of the analog gain. In this manner, aspects can enable a receiver to avoid reducing the gain when brief and infrequent jamming occurs, which in turn enables the receiver to maintain optimal, or at least increased, signal-to-noise (SNR) over a significant amount of time of the receiver operation.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

Example Wireless Communications

FIG. 1 illustrates a wireless communications system 100 with access points 110 and user terminals 120, in which aspects of the present disclosure may be practiced. For simplicity, only one access point 110 is shown in FIG. 1. An access point (AP) is generally a fixed station that communicates with the user terminals and may also be referred to as a base station (BS), an evolved Node B (eNB), a next generation Node B (gNB), or some other terminology. A user terminal (UT) may be fixed or mobile and may also be referred to as a mobile station (MS), an access terminal, user equipment (UE), a station (STA), a client, a wireless device, or some other terminology. A user terminal may be a wireless device, such as a cellular phone, a personal digital assistant (PDA), a handheld device, a wireless modem, a laptop computer, a tablet, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

Wireless communications system 100 employs multiple transmit and multiple receive antennas for data transmission on the downlink and uplink. Access point 110 may be equipped with a number $N_{ap}$ of antennas to achieve transmit diversity for downlink transmissions and/or receive diversity for uplink transmissions. A set $N_u$ of selected user terminals 120 may receive downlink transmissions and transmit uplink transmissions. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

Wireless communications system 100 may be a time division duplex (TDD) system or a frequency division duplex (FDD) system. For a TDD system, the downlink and uplink share the same frequency band. For an FDD system, the downlink and uplink use different frequency bands. Wireless communications system 100 may also utilize a single carrier or multiple carriers for transmission. Each user terminal 120 may be equipped with a single antenna (e.g., to keep costs down) or multiple antennas (e.g., where the additional cost can be supported). In some aspects, the access point 110 and/or user terminal 120 may include a jamming detection circuit for detecting jamming of a RF front-end receiver, as described in more detail herein.

Figure 2:
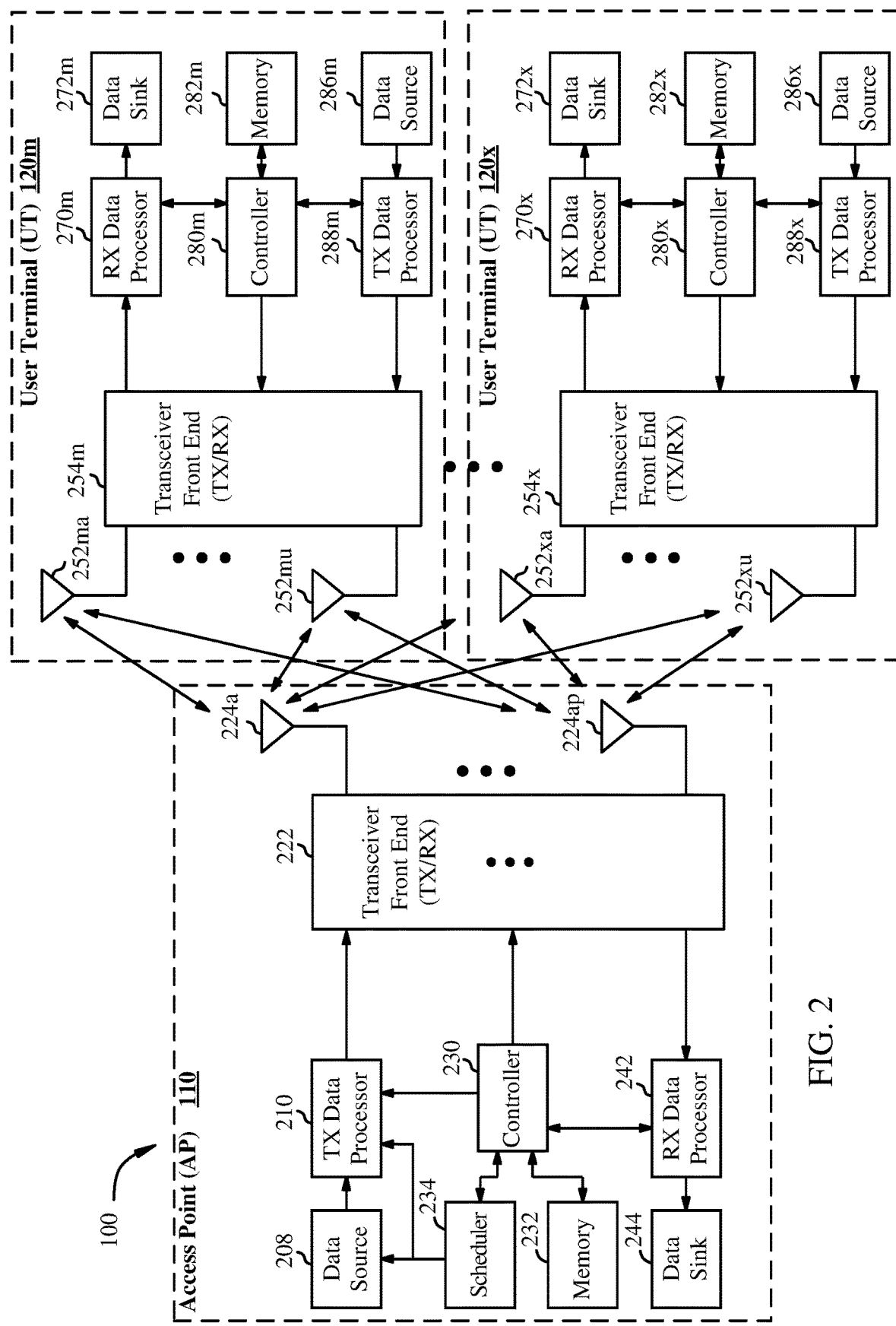
FIG. 2 is a block diagram of an example access point (AP) and example user terminals, in accordance with certain aspects of the present disclosure.

FIG. 2 shows a block diagram of access point 110 and two user terminals 120m and 120x in the wireless communications system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via one or more frequency channels, and a "receiving entity" is an independently operated apparatus or device capable of receiving data via one or more frequency channels. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. Beam-steering, beamforming, or some other spatial processing technique may be used at the access point and/or user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up}\}$ for the user terminal based on the coding and modulation schemes associated with the rate selected for the user terminal and provides a data symbol stream $\{s_{up}\}$ for one of the $N_{ut,m}$ antennas. A transceiver front end (TX/RX) 254 (also known as a radio frequency front end (RFFE)) receives and processes (e.g., converts to analog, amplifies, filters, and frequency upconverts) a respective symbol stream to generate an uplink signal. The transceiver front end 254 may also route the uplink signal to one of the $N_{ut,m}$ antennas for transmit diversity via an RF switch, for example. The controller 280 may control the routing within the transceiver front end 254. Memory 282 may store data and program codes for the user terminal 120 and may interface with the controller 280.

A number $N_{up}$ of user terminals 120 may be scheduled for simultaneous transmission on the uplink. Each of these user terminals transmits its set of processed symbol streams on the uplink to the access point.

At access point 110, $N_{ap}$ antennas 224a through 224ap receive the uplink signals from all $N_{up}$ user terminals transmitting on the uplink. For receive diversity, a transceiver front end 222 may select signals received from one of the antennas 224 for processing. The signals received from multiple antennas 224 may be combined for enhanced receive diversity. The access point's transceiver front end 222 also performs processing complementary to that performed by the user terminal's transceiver front end 254 and provides a recovered uplink data symbol stream. The recovered uplink data symbol stream is an estimate of a data symbol stream $\{s_{up}\}$ transmitted by a user terminal. An RX data processor 242 processes (e.g., demodulates, deinterleaves, and decodes) the recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 may provide a downlink data symbol streams for one of more of the $N_{dn}$ user terminals to be transmitted from one of the $N_{ap}$ antennas. The transceiver front end 222 receives and processes (e.g., converts to analog, amplifies, filters, and frequency upconverts) the symbol stream to generate a downlink signal. The transceiver front end 222 may also route the downlink signal to one or more of the $N_{ap}$ antennas 224 for transmit diversity via an RF switch, for example. The controller 230 may control the routing within the transceiver front end 222. Memory 232 may store data and program codes for the access point 110 and may interface with the controller 230.

At each user terminal 120, $N_{ut,m}$ antennas 252 receive the downlink signals from access point 110. For receive diversity at the user terminal 120, the transceiver front end 254 may select signals received from one or more of the antennas 252 for processing. The signals received from multiple antennas 252 may be combined for enhanced receive diversity. The user terminal's transceiver front end 254 also performs processing complementary to that performed by the access point's transceiver front end 222 and provides a recovered downlink data symbol stream. An RX data processor 270 processes (e.g., demodulates, deinterleaves, and decodes) the recovered downlink data symbol stream to obtain decoded data for the user terminal and stores same in data sink 272. In some aspects, the transceiver front end 254 or 222 may include a jamming detection circuit for detecting jamming of the transceiver front end 254 or 222, respectively, based on a received analog signal, as described in more detail herein.

Figure 3:
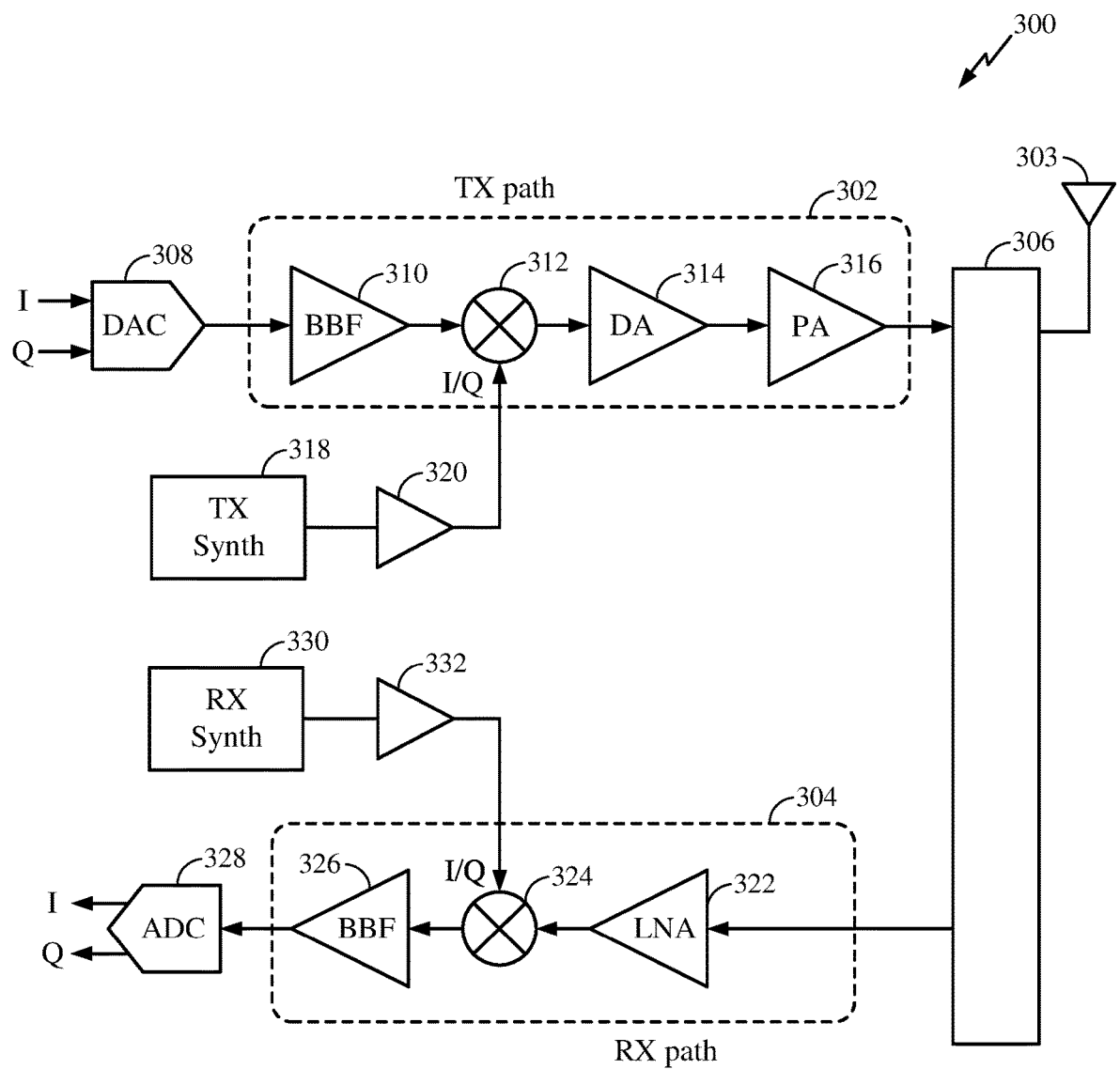
FIG. 3 is a block diagram of an example transceiver front end, in accordance with certain aspects of the present disclosure.

FIG. 3 is a block diagram of an example transceiver front end 300, such as transceiver front ends 222, 254 in FIG. 2, in which aspects of the present disclosure may be practiced. The transceiver front end 300 includes a transmit (TX) path 302 (also known as a transmit chain) for transmitting signals via one or more antennas and a receive (RX) path 304 (also known as a receive chain) for receiving signals via the antennas. When the TX path 302 and the RX path 304 share an antenna 303, the paths may be connected with the antenna via an interface 306, which may include any of various suitable RF devices, such as a duplexer, a switch, a diplexer, and the like. Note that although a single RX path and a single TX path are depicted in FIG. 3, the transceiver front end 300 can include multiple RX paths and/or multiple TX paths which can be connected to one or more antennas 303.

Receiving in-phase (I) or quadrature (Q) baseband analog signals from a digital-to-analog converter (DAC) 308, the TX path 302 may include a baseband filter (BBF) 310, a mixer 312, a driver amplifier (DA) 314, and a power amplifier (PA) 316. The BBF 310, the mixer 312, and the DA 314 may be included in a radio frequency integrated circuit (RFIC), while the PA 316 may be external to the RFIC. The BBF 310 filters the baseband signals received from the DAC 308, and the mixer 312 mixes the filtered baseband signals with a transmit local oscillator (LO) signal to convert the baseband signal of interest to a different frequency (e.g., upconvert from baseband to RF). This frequency conversion process produces the sum and difference frequencies of the LO frequency and the frequency of the signal of interest. The sum and difference frequencies are referred to as the beat frequencies. The beat frequencies are typically in the RF range, such that the signals output by the mixer 312 are typically RF signals, which may be amplified by the DA 314 and/or by the PA 316 before transmission by the antenna 303.

The RX path 304 includes a low noise amplifier (LNA) 322, a mixer 324, and a baseband filter (BBF) 326. The LNA 322, the mixer 324, and the BBF 326 may be included in a radio frequency integrated circuit (RFIC), which may or may not be the same RFIC that includes the TX path components. The LNA 322 may have an adjustable gain. RF signals received via the antenna 303 may be amplified by the LNA 322, and the mixer 324 mixes the amplified RF signals with a receive local oscillator (LO) signal to convert the RF signal of interest to a different baseband frequency (i.e., downconvert the RF signal to a baseband signal). The baseband signals output by the mixer 324 may be filtered by the BBF 326 before being converted by an analog-to-digital converter (ADC) 328 to digital I or Q signals for digital signal processing.

Although the block diagram of FIG. 3 depicts the transceiver front end 300 as a homodyne configuration utilizing a single frequency conversion, aspects of the present disclosure are not limited to this configuration. For example, one or more of the TX path 302 or the RX path 304 can be configured as a superheterodyne configuration utilizing more than one frequency conversion. For example, in the RX path 304, a first mixer (not shown, but replacing mixer 324) may be utilized to downconvert a received RF signal to an intermediate-frequency (IF) signal using a first LO signal, and a second mixer (not shown) may be utilized to downconvert the IF signal to a baseband (BB) signal using a second LO signal.

While it is desirable for the output of an LO to remain stable in frequency, tuning the LO to different frequencies may entail using a variable-frequency oscillator. Contemporary systems may employ frequency synthesizers with a voltage-controlled oscillator (VCO) to generate a stable, tunable LO with a particular tuning range. Thus, the transmit LO frequency may be produced by a TX frequency synthesizer 318, which may be buffered or amplified by amplifier 320 before being mixed with the baseband signals in the mixer 312. Similarly, the receive LO frequency may be produced by an RX frequency synthesizer 330, which may be buffered or amplified by amplifier 332 before being mixed with the RF signals in the mixer 324.

Example Millimeter Wave Jamming and Detection

Current millimeter wave (mmW) radios may be susceptible to jamming beams caused by other mmW radios. In some cases, the jamming signals may be due in part to the use of RF beamforming (BF). For example, mmW radios may use RF beamforming (BF) to increase signal gain or provide directionality. BF generally refers to a process used to control the directionality of transmission and/or reception of radio signals to increase the signal gain in a particular direction. The beamforming process can help address one of the problems for communication at the mmW spectrum, which is the high path loss of the mmW communication. One issue with the use of beamforming is that a receiver (e.g., mmW radio) can be susceptible to jamming beams caused by other mmW radios. Note, however, that beamforming is a reference example of a communication technique that can cause jamming signals, and that mmW radios can be susceptible to jamming beams caused by other mmW radios that do not employ beamforming.

Because current mmW radios may employ a baseband filter that eliminates the jamming signals (outside of the baseband filter bandwidth), the jamming signals may be attenuated in the ADC output, and may not be detected by the AGC logic. This, in turn, can cause saturation at the IF output of the RX chain of the receiver.

Figure 4:
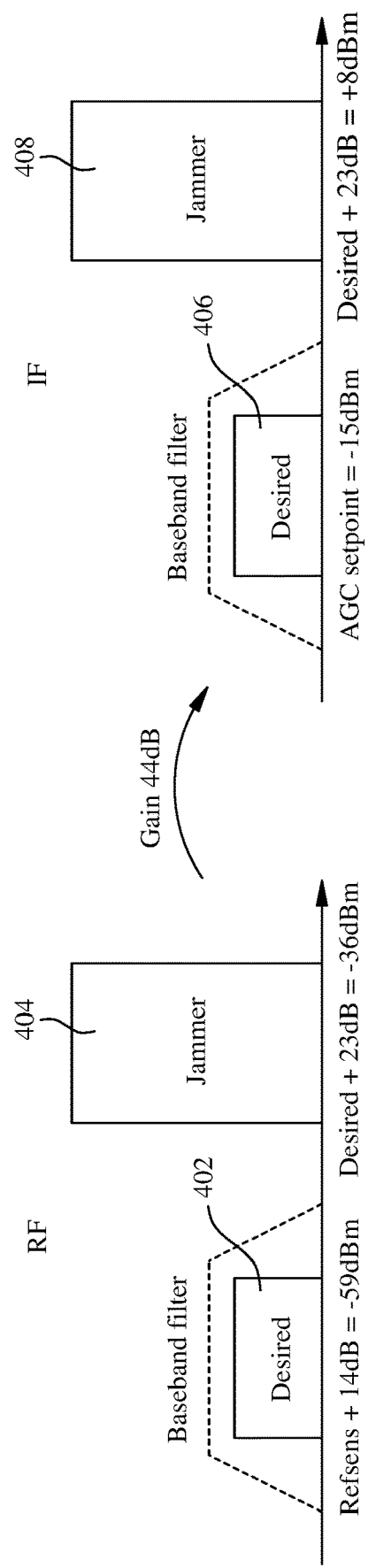
FIG. 4 illustrates an example jamming scenario for a receiver, in accordance with certain aspects of the present disclosure.

Consider the scenario in FIG. 4, which depicts an example of a jammer causing saturation at the IF output of a receiver. In this example, the receiver may implement a baseband filter that passes the frequencies of the RF signal 402 and attenuates frequencies of the jamming RF signal 404. The RF signal 402 may be down converted to an IF signal 406, which may be converted into a digital signal (e.g., after passing through an ADC) (not depicted in FIG. 4, but which may be similar to ADC 328). When the digital signal is processed (e.g., demodulated) by a data processor (not depicted in FIG. 4, but which may be similar to RX data processor 242 or 270), the data processor may determine that the power level of the digital signal is below a threshold (e.g., below AGC_setpoint=−15 decibels per milliwatt (dBm)). In response, the data processor may trigger the AGC to set the analog gain of an amplifier (e.g., the LNA 322) in the receive chain to 44 dB, increasing the power level of the RF signal 402, and in turn, increasing the power level of the IF signal 406 to the threshold (e.g., AGC_setpoint=−15 dBm).

However, due to the attenuation of the jamming RF signal 404 by the baseband filter, the data processor may not detect the presence of the jamming IF signal 408 (e.g., in the ADC output). Consequently, when the analog gain is set to 44 dB, this may cause the power level of the jamming RF signal 404 to also increase by 44 dB. The increase in the power level of the jamming RF signal 404 may result in increasing the power level of the jamming IF signal 408 to +8 dBm and saturating the IF output of the receiver.

Figure 5:
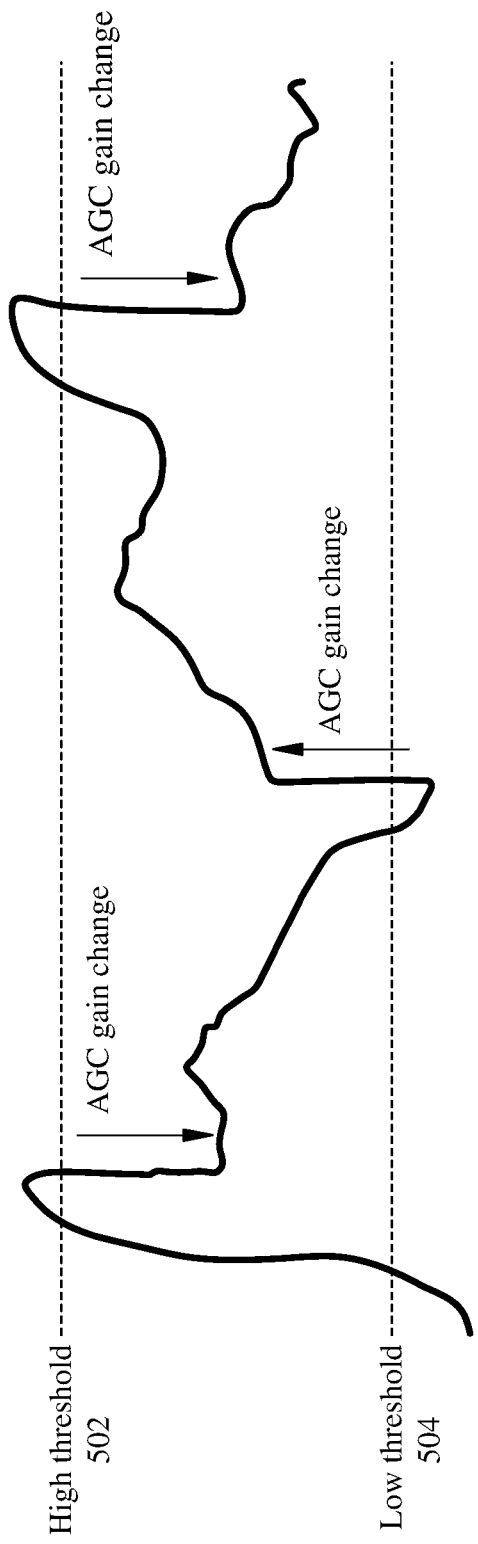
FIG. 5 illustrates an example automatic gain control scheme, in accordance with certain aspects of the present disclosure.

In some aspects, a jamming detection circuit can be placed prior to the baseband filter in the RX path to enable the AGC logic to account for the jamming signals in the digital domain. As described below, the jamming detection circuit may be configured with hysteresis to reduce the ping-pong effect of the AGC logic constantly changing the gain. As illustrated in FIG. 5, for example, the jamming detection circuit may trigger the AGC logic to lower the gain when the broadband signal level exceeds a high threshold 502, and may trigger the AGC logic to increase the gain when the broadband signal level is below a low threshold 504. When the broadband signal level is between the high threshold 502 and the low threshold 504, the AGC logic may not change the gain. In some cases, to avoid constant changes in the gain, the difference between the high threshold 502 and the low threshold 504 may be greater than the gain step.

While the AGC scheme illustrated in FIG. 5 can be used to prevent clipping, in some cases, it can lead to poor average SNR in dynamic jamming scenarios. For example, the AGC scheme in FIG. 5 involves the AGC logic changing the gain upon detecting the signal level crossing the high threshold 502. However, for some mmW systems, the receiver may be occasionally hit by a jamming signal. Thus, in these scenarios where the receiver is occasionally hit by a jamming signal, reducing the gain upon detecting that the high threshold 502 is crossed can cause an unnecessary reduction in the gain, leading to lowered SNR and degraded throughput.

In some aspects, the jamming detection circuit described herein may implement a "statistics-based AGC scheme," which may be used in dynamic jamming scenarios. The "statistics-based AGC scheme" may enable the receiver to have an improved average SNR (compared to the SNR achieved with the AGC scheme illustrated in FIG. 5) by allowing for occasional jamming of the receiver during a first portion of the receiver's operation (e.g., a first number of symbols), but allowing for better SNR for a longer second portion of the receiver's operation (e.g., a second number of symbols). When implementing the "statistics-based AGC scheme," the throughput loss of the receiver that is caused by lost symbols during the seldom jamming events may be outweighed by the improved throughput of the receiver caused by the improved SNR during other symbols.

In some aspects, the AGC scheme illustrated in FIG. 5 can be modified to implement the "statistics-based AGC scheme." For example, instead of immediately adjusting the gain upon detecting the signal level crossing the high threshold 502 or low threshold 504, the jamming detection circuit may be configured to determine an amount of jamming that occurs over a measurement window. The amount of jamming can include at least one of: (i) an amount of time that jamming occurs over the measurement window or (ii) a percentage of jamming over the measurement window. The measurement window may be a predetermined amount of time (e.g., a predetermined number of symbols) of the receiver's operation. Note that while many of the aspects described herein describe performing jamming detection of IF signals, the techniques described herein can be used to perform jamming detection of other types of reception signals, such as RF signals, baseband signals (e.g., prior to baseband filtering), etc.

Figure 6:
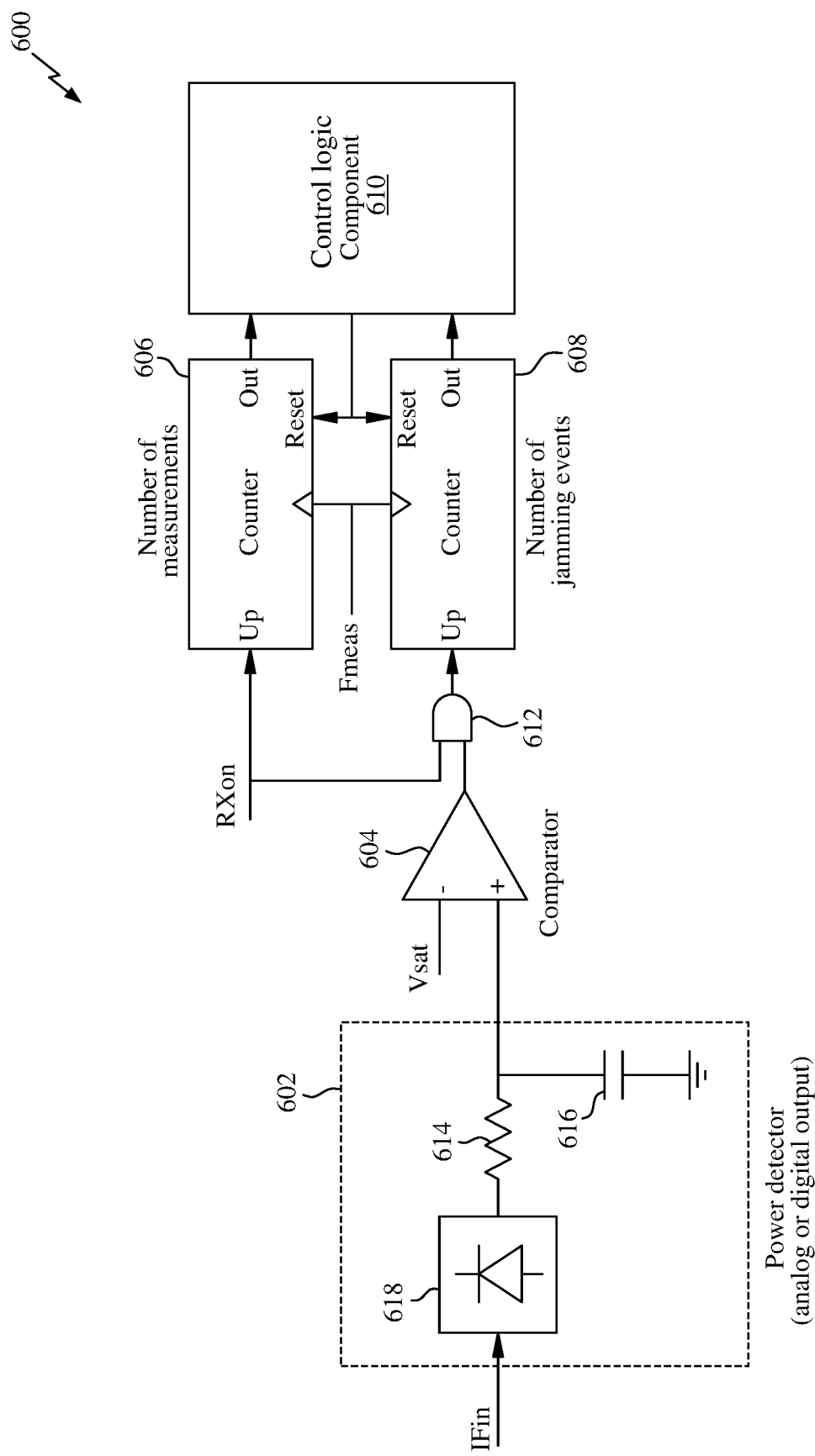
FIG. 6 illustrates an example circuit for performing jamming detection, in accordance with certain aspects of the present disclosure.

FIG. 6 illustrates an example circuit 600 for performing jamming detection, in accordance with certain aspects of the present disclosure. The circuit 600 is one example hardware implementation for determining an amount of jamming of a receiver over a measurement window. Note that the circuit 600 depicted in FIG. 6 may be used to detect jamming for a single threshold (e.g., high threshold 502 or low threshold 504). Those of ordinary skill in the art should recognize that a similar circuit can be used to detect jamming for another (additional) threshold, e.g., to implement hysteresis. In some aspects, the circuit 600 may be used in a receiver configured for homodyne operation (e.g., transceiver front end 300 configured for homodyne operation).

The circuit 600 includes a power detector circuit 602, a comparator 604, a counter 606, a counter 608, a control logic component 610, and an AND logic gate 612. As shown, the power detector circuit 602 includes a diode 618, a resistor 614, and a capacitor 616. The power detector circuit 602 is configured to determine a power level of the IF signal (IFin). The power detector circuit 602 may be configured to provide an analog output or a digital output.

The comparator 604 has a first input coupled to the output of the power detector circuit 602 and has a second input coupled to a voltage source with an output voltage labeled "Vsat." The comparator 604 is configured to compare the power level of the IF signal to the threshold defined by the Vsat voltage or digital word, and to output a digital signal, based on the comparison. The counter 606 is generally configured to count a number of measurements of the power level of the IF signal. The counter 608 is generally configured to count a number of jamming events (e.g., a number of times that the power level of the IF signal exceeds Vsat).

As shown in FIG. 6, the counter 606 and the counter 608 are clocked by a same clock signal (Fmeas). Fmeas is the measurement clock (e.g., a measurement is taken for every particular type of transition of Fmeas). The counter 606 has an input configured to receive an indication of whether the receiver is active or on (e.g., RXon) and has an output coupled to a first input of the control logic component 610. The counter 606 may be configured to increment the number of measurements of the power level of the IF signal by one for each rising edge or each falling edge of the clock signal (e.g., Fmeas), while at least a portion of the RX path is activated (e.g., RXon is logic high).

The counter 608 has an input coupled to the output of the AND logic gate 612. The AND logic gate 612 has a first input configured to receive an indication of RXon and has a second input configured to receive the output of the comparator 604. The counter 608 may be configured to increment the number of jamming events by one each time that the power level of the IF signal exceeds Vsat (e.g., the output of the comparator 604 is logic high), while at least a portion of the RX path is activated (e.g., RXon is logic high).

The control logic component 610 has a first input coupled to the output of the counter 606 and has a second input coupled to the output of the counter 608. The control logic component 610 also has an output configured to reset the counters 606, 608. The control logic component 610 may determine an amount of jamming over the measurement window based on (i) the number of times that the power of the IF signal exceeds the first threshold (e.g., value of counter 608) and (ii) the number of measurements (e.g., value of counter 606). In one example, the control logic component 610 can read the counters 606 and 608, and divide the value of counter 608 (e.g., jamming event counter value) by the value of counter 606 (e.g., measurement counter value) to determine the fraction of time that jamming occurred over the measurement window.

If the control logic component 610 determines that the amount of jamming is greater than a predetermined threshold (e.g., the fraction or percentage of jamming is greater than a threshold), then the control logic component 610 can generate a logic signal to trigger the AGC logic to reduce the analog gain of an amplifier (e.g., LNA 322) in the RX path (e.g., RX path 304) of the receiver. On the other hand, if the control logic component 610 determines that the amount of jamming is less than another predetermined threshold (e.g., the fraction or percentage of jamming is below a threshold), then the control logic component 610 can generate a logic signal to trigger the AGC logic to increase the analog gain of an amplifier (e.g., LNA 322) in the RX path (e.g., RX path 304) of the receiver. In this manner, aspects presented herein can provide a "statistics-based AGC scheme" that reduces the analog gain when the jamming is frequent or persists and that refrains from reducing the analog gain when brief and infrequent jamming occurs, thereby maintaining optimal, or at least increased, SNR for a significant portion of the receiver's operation.

Note that FIG. 6 depicts a reference example of a jamming detection circuit that can be used for single-band operation. For example, in single-band operation, the circuit 600 can be placed at the IF output to detect for saturation. Aspects presented herein also provide techniques and apparatus for performing jamming detection for dual-band operation.

Figure 7:
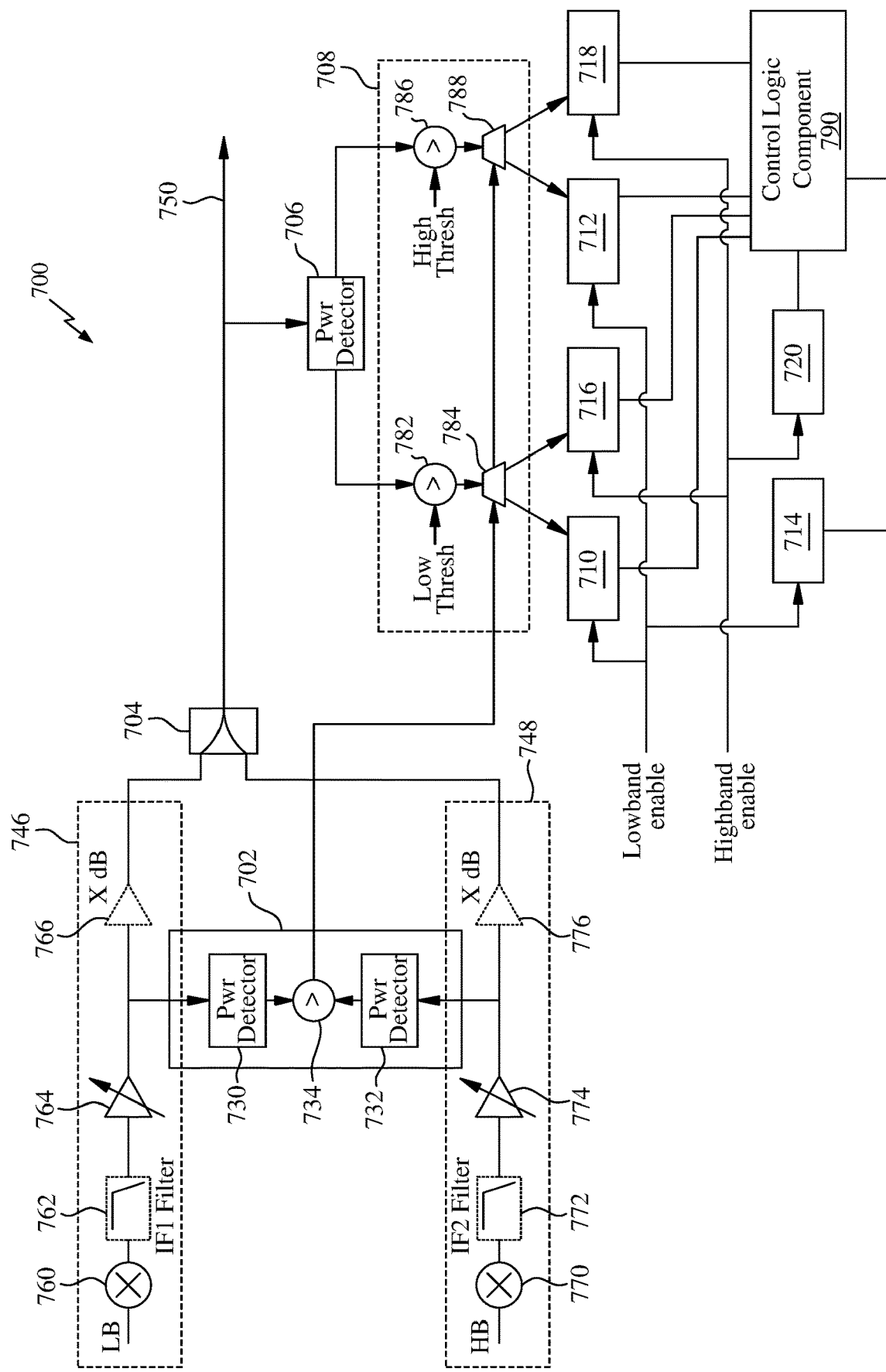
FIG. 7 illustrates an example apparatus for performing jamming detection in a dual-band scenario, in accordance with certain aspects of the present disclosure.

FIG. 7 illustrates an example apparatus 700 for performing jamming detection, in accordance with certain aspects of the present disclosure. The apparatus 700 is one example implementation for determining an amount of jamming of a dual-band receiver over a measurement window. In one aspect, the apparatus 700 may include one or more components or circuitry of a RFIC or a transceiver front end configured for superheterodyne operation (e.g., transceiver front end 300 configured for superheterodyne operation).

The apparatus 700 includes a RX path 746, a RX path 748, a combiner circuit 704, an IF path 750 (also referred to as an IF interface, IF cable, or IF wire), a power detector circuit 702, a power detector circuit 706 (also referred to as a power sensor or power detector), a selection circuit 708, counters 710, 712, 714, 716, 718, and 720, and control logic component 790. The RX path 746 may be configured to receive a first RF signal (via an antenna, which is not shown) associated with a first band (e.g., low band). The RX path 748 may be configured to receive a second RF signal (via an antenna, which is not shown) associated with a second band (e.g., high band). The first RF signal, for example, may include a low band mmW signal, and the second RF signal may include a high band mmW signal.

The RX path 746 includes a mixer 760, an IF filter 762 (labeled "IF1 filter"), a variable gain amplifier 764, and a buffer 766. The RX path 748 includes a mixer 770, an IF filter 772 (labeled "IF2 filter"), a variable gain amplifier 774, and a buffer 776. The mixer 760 may be driven by a LO (not shown) to downconvert the first RF signal to a first IF signal. The first IF signal output from the mixer 760 may be filtered (via IF filter 762), amplified (e.g., via variable gain amplifier 764), and buffered (e.g., via buffer 766) before being input into the combiner circuit 704. Similarly, the mixer 770 may be driven by a different LO (not shown) to downconvert the second RF signal to a second IF signal. The second IF signal output from the mixer 770 may be filtered (via IF filter 772), amplified (e.g., via variable gain amplifier 774), and buffered (e.g., via buffer 776) before being input into the combiner circuit 704. The frequencies of the first IF signal may be different than the frequencies of the second IF signal. Note that the RX paths 746, 748 are reference examples of RX paths that may be included within the apparatus 700, and that the apparatus 700 may include RX paths with different components. For example, in some aspects, the RX path 746 may not include IF filter 762 and/or buffer 766. Similarly, the RX path 748 may not include IF filter 772 and/or buffer 776. Hence, the buffers 766, 776, and the IF filters 762, 772 are illustrated with dashed lines in FIG. 7.

The combiner circuit 704 has a first input coupled to the output of the buffer 766 and has a second input coupled to the output of the buffer 776. The combiner circuit 704 is configured to combine the first IF signal and the second IF signal to the IF path 750. The power detector circuit 706 is coupled to the IF path 750 and is configured to determine the combined power of the first IF signal and the second IF signal.

By placing the power detector circuit 706 at the output of the combiner circuit 704, aspects may be able to more accurately detect saturation than if a power detector circuit were placed at the inputs of the buffers 766 and 776. When the power detector circuit 706 is coupled to the IF path 750, aspects may use the power detector circuit 702 to determine which of the two IF signals is causing the saturation at the output of the combiner circuit 704. As shown in FIG. 7, the power detector circuit 702 is coupled to RX path 746 and to RX path 748. The power detector circuit 702 is generally configured to generate a control signal based on the relative power between the first IF signal of RX path 746 and the second IF signal of RX path 748.

Here, the power detector circuit 702 includes a power detector circuit 730 (also referred to as a power sensor or power detector), a comparator 734, and a power detector circuit 732 (also referred to as a power sensor or power detector). The input of the power detector circuit 730 is coupled to the RX path 746 (e.g., at the input to buffer 766) and is configured to determine a power of the first IF signal. The input of the power detector circuit 732 is coupled to the RX path 748 (e.g., at the input to buffer 776) and is configured to determine a power of the second IF signal. The comparator 734 has input coupled to the outputs of power detector circuits 730, 732. The comparator 734 is configured to compare the power of the first IF signal to the power of the second IF signal, and to generate a control signal, based on the comparison. For example, the control signal may indicate whether the first IF signal has a higher power than the second IF signal, or vice versa.

The selection circuit 708 is generally configured to couple the output of the power detector circuit 706 to at least a portion of a set of counters for low band processing or to at least a portion of a set of counters for high band processing, based on the control signal output from the comparator 734 of the power detector circuit 702. For example, the low band processing counters (associated with the first IF signal) may include counters 710, 712, and 714, and the high band processing counters (associated with the second IF signal) may include counters 716, 718, and 720.

Counter 710 (also referred to as a lowband, low threshold counter) may be configured to count a number of times the power of the first IF signal is below a low threshold (e.g., low threshold 504), counter 712 (also referred to as a lowband, high threshold counter) may be configured to count a number of times the power of the first IF signal exceeds a high threshold (e.g., high threshold 502), and counter 714 (also referred to as a lowband measurement counter) may be configured to count a number of measurements of the first IF signal.

Counter 716 (also referred to as a highband, low threshold counter) may be configured to count a number of times the power of the second IF signal is below a low threshold (e.g., low threshold 504), counter 718 (also referred to as a highband, high threshold counter) may be configured to count a number of times the power of the second IF signal exceeds a high threshold (e.g., high threshold 502), and counter 720 (also referred to as a highband measurement counter) may be configured to count a number of measurements of the second IF signal.

In some aspects, the selection circuit 708 may couple the output of the power detector circuit 706 to one or more of the low band processing counters (e.g., counters 710 and 712) when the control signal output from the power detector circuit 702 indicates that the power of the first IF signal (e.g., associated with the low band) is greater than the power of the second IF signal (e.g., associated with the high band). In some aspects, the selection circuit 708 may couple the output of the power detector circuit 706 to one or more of the high band processing counters (e.g., counters 716 and 718) when the control signal output from the power detector circuit 702 indicates that the power of the second IF signal is greater than the power of the first IF signal.

In this implementation, the selection circuit 708 includes a comparator 782, a demultiplexer 784, a comparator 786, and a demultiplexer 788. The comparator 782 has a first input coupled to the output of the power detector circuit 706 and has a second input coupled to a low threshold (e.g., low threshold 504). The comparator 782 is configured to compare the combined power of the first and second IF signals to the low threshold and to generate a first input signal based on the comparison. The comparator 786 has a first input coupled to the output of the power detector circuit 706 and has a second input coupled to a high threshold (e.g., high threshold 502). The comparator 786 is configured to compare the combined power of the first and second IF signals to the high threshold and to generate a second input signal based on the comparison.

The demultiplexer 784 has a data input coupled to the output of the comparator 782 and has a control input coupled to the output of the power detector circuit 702. The demultiplexer 784 is generally configured to activate at least one counter in the low band processing counters or the high band processing counters, based at least in part on the input signal (from comparator 782) and the control signal (from power detector circuit 702). For example, the demultiplexer 784 may activate counter 710 when (i) the input signal indicates that the combined power of the first and second IF signals is below the low threshold, (ii) the control signal indicates that the power of the first IF signal is greater than the power of the second IF signal, and (iii) lowband enable is logic high (e.g., at least a portion of RX path 746 is on). In another example, the demultiplexer 784 may activate counter 716 when (i) the input signal indicates that the combined power of the first and second IF signals is below the low threshold, (ii) the control signal indicates that the power of the second IF signal is greater than the power of the first IF signal, and (iii) highband enable is logic high (e.g., at least a portion of RX path 748 is on).

The demultiplexer 788 has a data input coupled to the output of the comparator 786 and has a control input coupled to the output of the power detector circuit 702. The demultiplexer 788 is generally configured to activate at least one counter in the low band processing counters or the high band processing counters, based on the input signal (from comparator 786) and the control signal (from power detector circuit 702). For example, the demultiplexer 788 may activate counter 712 when (i) the input signal indicates that the combined power of the first and second IF signals is greater than the high threshold, (ii) the control signal indicates that the power of the first IF signal is greater than the power of the second IF signal, and (iii) lowband enable is logic high. In another example, the demultiplexer 788 may activate counter 718 when (i) the second input signal indicates that the combined power of the first and second IF signals is greater than the high threshold, (ii) the control signal indicates that the power of the second IF signal is greater than the power of the first IF signal, and (iii) highband enable is logic high.

The counters 714 and 720 may be activated based on the lowband enable and the highband enable, respectively. For example, the counter 714 may be activated when lowband enable is logic high. The counter 720 may be activated when highband enable is logic high.

The control logic component 790 has a first input coupled to an output of counter 710, a second input coupled to an output of counter 712, a third input coupled to an output of counter 714, a fourth input coupled to an output of counter 716, a fifth input coupled to an output of counter 718, and a sixth input coupled to an output of counter 720. In some aspects, the control logic component 790 may determine at least one of: (i) an amount of the jamming of the low band over a measurement window, based on the number of times that the power of the first IF signal exceeds the high threshold (e.g., a value of counter 712) and on the number of measurements of the power of the first IF signal (e.g., a value of counter 714); or (ii) an amount of non-jamming of the low band over the measurement window, based on the number of times that the power of the first IF signal is below the low threshold (e.g., a value of counter 710) and on the number of measurements of the power of the first IF signal (e.g., a value of counter 714).

In one aspect, the control logic component 790 may generate a logic signal to trigger a reduction in an analog gain of an amplifier in the RX path 746 when the amount of the jamming of the low band exceeds a threshold. In one aspect, the control logic may generate a logic signal to trigger an increase in the analog gain when the amount of non-jamming of the low band exceeds a threshold.

In some aspects, the control logic component 790 may determine at least one of: (i) an amount of the jamming of the high band over a measurement window, based on the number of times that the power of the second IF signal exceeds the high threshold (e.g., a value of counter 718) and on the number of measurements of the power of the second IF signal (e.g., a value of counter 720); or (ii) an amount of non-jamming of the high band over the measurement window, based on the number of times that the power of the second IF signal is below the low threshold (e.g., a value of counter 716) and on the number of measurements of the power of the second IF signal (e.g., a value of counter 720).

In one aspect, the control logic component 790 may generate a logic signal to trigger a reduction in an analog gain of an amplifier in the RX path 748 when the amount of the jamming of the high band exceeds a threshold. In one aspect, the control logic may generate a logic signal to trigger an increase in the analog gain when the amount of non-jamming of the high band exceeds a threshold.

Figure 8:
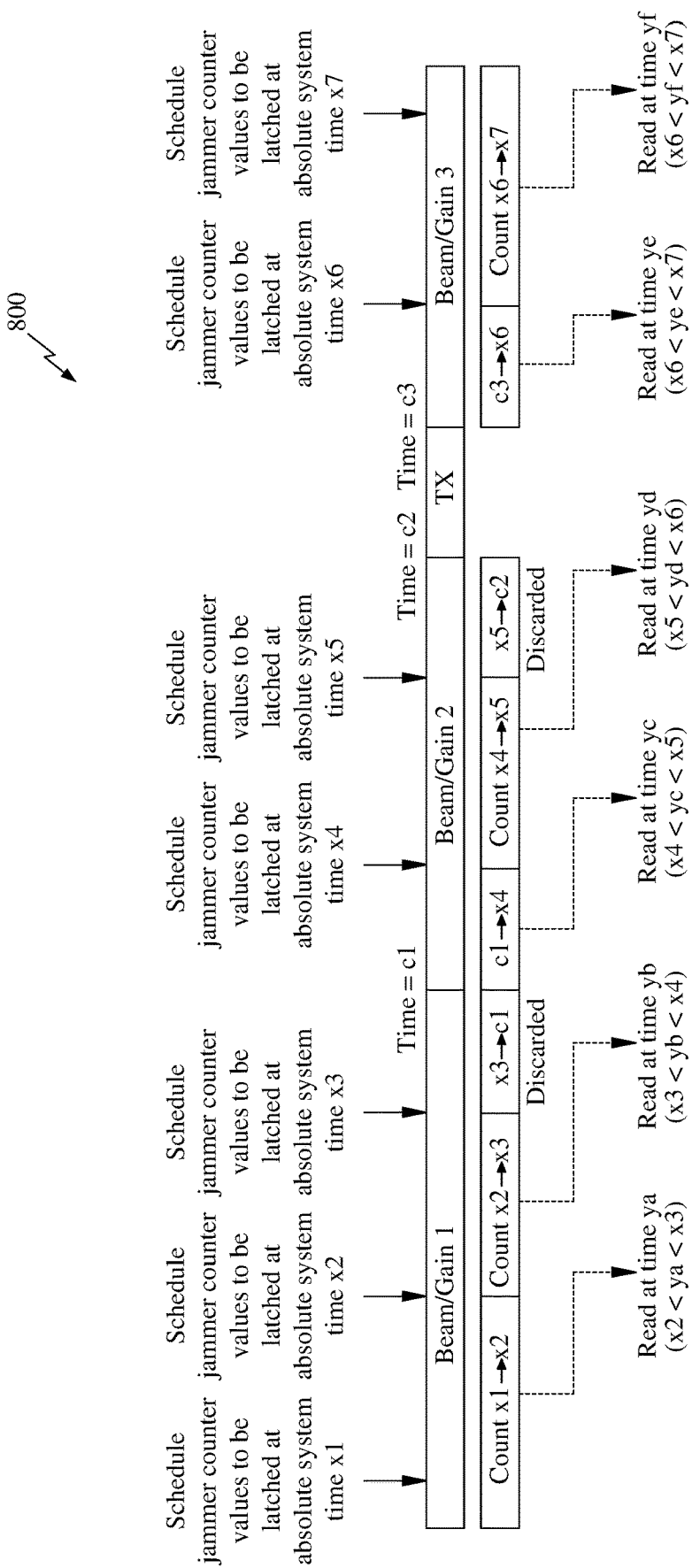
FIG. 8 illustrates an example timeline for reading one or more counters of a jamming detection circuit, in accordance with certain aspects of the present disclosure.

FIG. 8 illustrates an example timeline 800 for reading one or more counters of a jamming detection circuit, in accordance with certain aspects of the present disclosure. In some aspects, the timeline 800 may be used by a control logic (e.g., control logic component 610, control logic component 790, etc.) within a jamming detection apparatus (e.g., circuit 600, apparatus 700, etc.). For the sake of clarity, FIG. 8 illustrates the timeline for a single band. Note, however, that a similar timeline can be used for other bands.

In some aspects, the control logic may perform a multi-step process in order to access a given counter used to perform jamming detection. The multi-step process may involve scheduling a command to latch the counter values at an absolute system time x, and subsequently reading back the latched values anytime before the next scheduled latch operation. This multi-step process may allow the AGC logic to determine the beam/gain state associated with the read back values based on the absolute system time x (e.g., hardware does not have to latch the beam/gain state for readback). That is, the AGC logic can perform readings (at times $x_n$) that are independent of the actual RX operation (e.g., the AGC readings do not need to be coordinated with the beam/gain changes).

As shown in FIG. 8, the control logic may initially schedule the jammer counter values to be latched at absolute system time $x_1$, when the IF signal is associated with a first type of transmit beam and a first gain state (e.g., "beam/gain 1"). Within a latch period (e.g., $x_1 \rightarrow x_2$), the counters may count the number of measurements (m) in that time period, as well as the number of times the jamming threshold is exceeded (n). The proportion of time that jamming occurs may then be determined as n/m.

In some aspects, the measurements within a given latch period can be aggregated. For example, the proportion of time being jammed when the IF signal is using "beam/gain 1" may be (na+nb)/(ma+mb) where "a" and "b" refer to reading ya and yb, respectively. Similarly, the proportion of time being jammed when the IF signal is using "beam/gain 2" may be (nc+nd)/(mc+md), where "c" and "d" refer to reading yc and yd, respectively. In some aspects, the control logic may discard portions of the measurements that occur when the beam and/or gain is transitioning. As shown in FIG. 8, for example, the control logic may discard (x3→c1) and (x5→c2) portions. In some cases, the control logic may not keep track of the c1, c2, and so on time values. In some cases, the control logic may keep track which absolute system times (x1, x2, x3) are associated with the multiple beam/gains (e.g., beam/gain 1, beam/gain 2, etc.) to avoid aggregating averages across beam/gain boundaries.

In some aspects, the control logic (e.g., control logic component 610, control logic component 790) may be configured to perform jamming mitigation to assist receiver AGC logic with detecting consistent jammers and sufficiently mitigating the impact of the jamming signals. In some aspects, the control logic may implement jamming mitigation based on the IF power measurements of the time density of the events where the IF power exceeds a threshold. The control logic can increase the gain state if a jammer is present, thereby triggering a reduction in the analog gain. Additionally or alternatively, the control logic can implement power hysteresis to avoid ping-pong behavior and/or timing hysteresis to react to consistently present jammers.

In some aspects, the control logic can use a sliding window or a circular buffer to determine the presence of a consistent jammer signal. The use of a circular buffer may enable the control logic to handle burst jammers and to avoid creating ping-pong behavior. Additionally, the circular buffer may enable a "forgetting" mechanism to discard stale measurements. The control logic may use a counter-based exit criterion to smoothly reduce the gain state impact when a jammer is not detected.

In some aspects, the gain state determined by the control logic may be known by the baseline RX AGC logic. When the control logic is in jamming detection mode, the control logic may issue an avert flag to the baseline RX AGC logic to prevent the gain state drop until exiting detection mode (e.g., to avoid a race between the baseline RX AGC and jamming mitigation). In the jamming detection mode, the control logic may use multiple increments for the same baseline gain state (e.g., one step at every repopulation of the buffer). Similarly, during exiting detection mode, the control logic may use multiple gain state drops (e.g., one step at a time upon reaching the exit limit).

In some aspects, the control logic may update one or more density measurements n, m, and t on symbol transitions, where "n" is the number of times the power of the IF signal exceeds the high threshold, "m" is the number of times the power of the IF signal is below the low threshold, and "t" is the number of measurements of the power of the IF signal. The density measurements can be updated based on the following rules: (i) receive to receive (R2R)→Clear; (ii) receive to transmit (R2T)→Stop; and (iii) transmit to receiver (T2R)→Clear and Start.

In some aspects, while in connected mode, the buffer and other sub-processes may be updated for the counters read from the serving beam and measurements from the non-serving beam may be discarded. In idle mode, the jamming mitigation may run on the beam indicate by a beam manager and can be applied to correct the gain state derived based on the reference signal receive power (RSRP) measurement.

Figure 9:
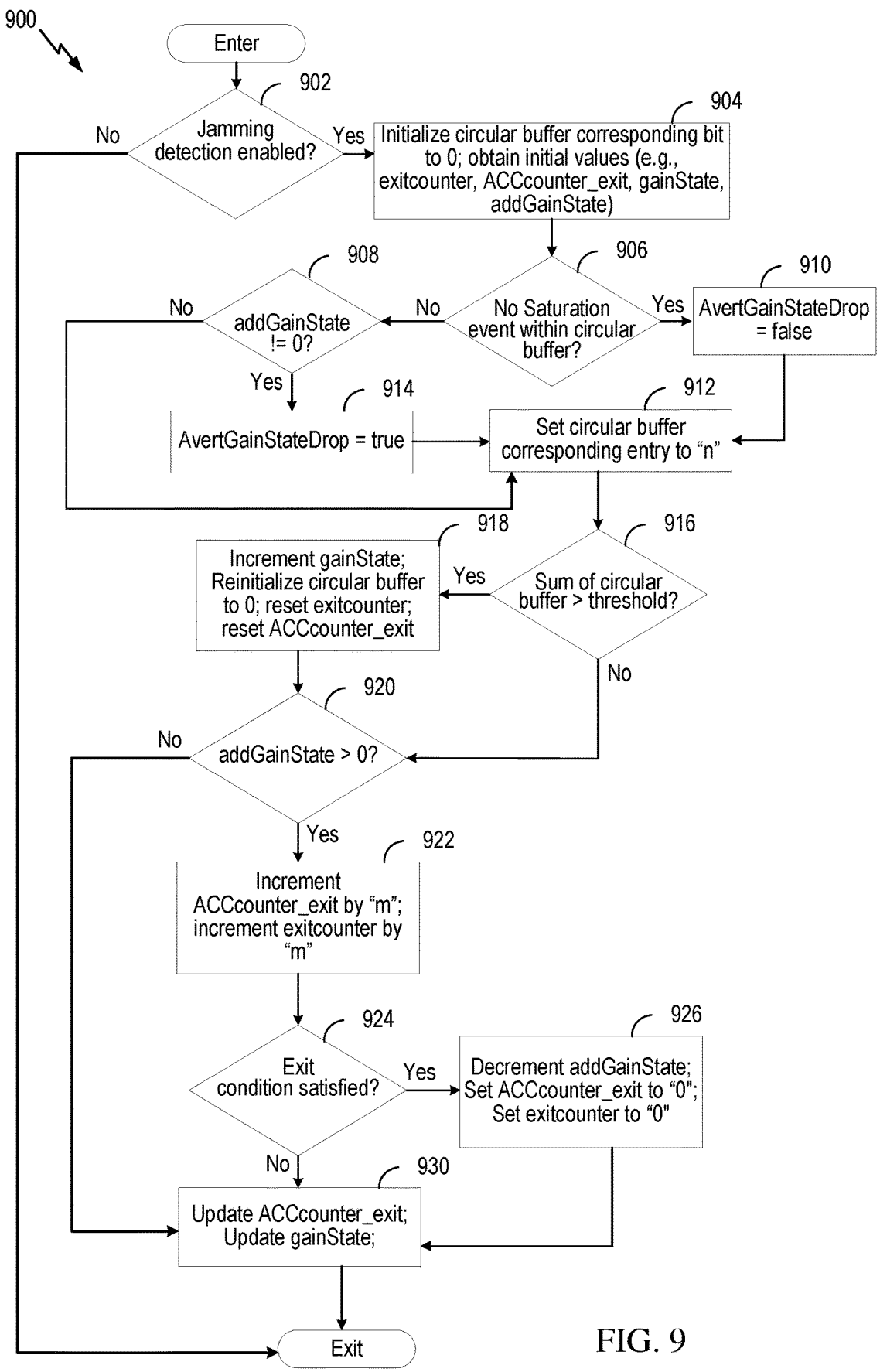
FIG. 9 is a flowchart of a method for performing jamming mitigation, in accordance with certain aspects of the present disclosure.

FIG. 9 is a flowchart of a method 900 for performing jamming mitigation, in accordance with certain aspects of the present disclosure. The method 900 may be performed by an apparatus (e.g., circuit 600, apparatus 700, etc.). Note that the method 900 may be performed for jamming mitigation of a single band. In some aspects, the method 900 may enable the apparatus to refrain from responding to sporadic jammer signals and instead enable the apparatus detect and react to a "consistent" jammer pattern, which can degrade the performance of the data path by consistent saturation.

Method 900 may enter at block 902, where the apparatus determines if jamming detection is enabled. If not, the method 900 exits. If jamming detection is enabled, the apparatus initializes the corresponding entry (e.g., bit) of a circular buffer to 0 (block 904). For example, the circular buffer may have a number of entries equal to a predefined length of a sliding window. At block 904, the apparatus may also obtain one or more initial values for one or more parameters. For example, the parameters can include an "exitcounter" parameter, an "ACCcounter_exit" parameter, a "gainState" parameter, an "addGainState" parameter, etc.

At block 906, the apparatus determines whether there is an absence of a saturation event within the circular buffer. For example, the apparatus can determine there is not a saturation event if the sum of the circular buffer is equal to 0. If the apparatus determines there is not a saturation event (block 906), then the apparatus may remove the avertGainStateDrop state (e.g., avertGainStateDrop=false) (block 910), and the method proceeds to block 912. If, at block 906, the apparatus determines there is a saturation event, then the apparatus determines whether the "addGainState" parameter is nonzero (block 908). If so, the apparatus may set the avertGainStateDrop state=true (e.g., to prevent the AGC gain state from dropping on its own to eliminate a racing condition) (block 914), and the method proceeds to block 912.

At block 912, the apparatus sets the circular buffer corresponding entry to "n," where "n" is the number of IF power measurements that exceed the high threshold. At block 916, the apparatus determines whether the sum of the circular buffer is greater than a threshold (e.g., to detect a jammer burst). If so, then the apparatus may increment the "addGainState" parameter (e.g., by one), reinitialize the circular buffer, set avertGainStateDrop state=true, and reset the "exitcounter" and "ACCcounter_exit" parameters to 0 (block 918). If the sum of the circular buffer is not greater than the threshold (block 916), the method proceeds to block 920.

At block 920, the apparatus determines whether the "addGainState" parameter is greater than zero. If so, then the apparatus increments the "ACCcounter_exit" parameter by "m," where "m" is the number of IF power measurements that are below the low threshold (block 922). In this manner, the "ACCcounter_exit" parameter may function, for example, as a register to keep the density of occurrences of the jammer power being below the low threshold. At block 922, the apparatus also increments the "exitcounter" parameter by "m." At block 924, the apparatus determines whether an exit condition is satisfied. In one example, the exit condition may be based at least in part on the "exitcounter" parameter and the "ACCcounter_exit" parameter. For example, if "exitcounter/ACCcounter_exit>=threshold_exit" and "ACCcounter_exit>=slidingwinleng_exit," the exit condition may be satisfied. If the exit condition is satisfied, then the apparatus may decrement the "addGainState" parameter (e.g., by one), and reset the "ACCcounter_exit" parameter and the "exitcounter" parameter to 0 (block 926).

At block 930, the apparatus may update the "ACCcounter_exit" parameter (e.g., ACCcounter_exit+=t−(n−m)) and the "gainState" parameter (e.g., gainState+=addGainState). The method 900 may then exit.

Figure 10:
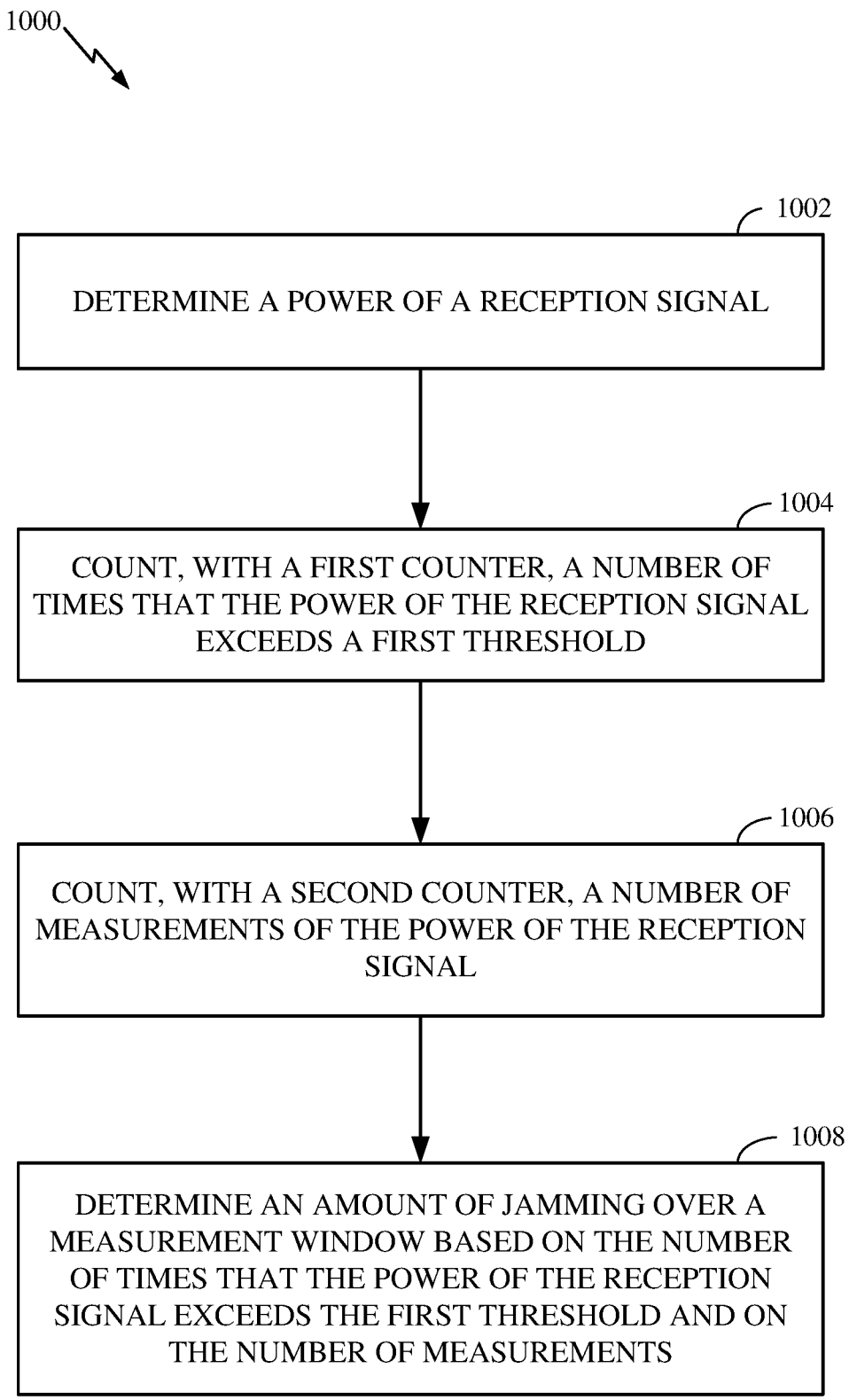
FIG. 10 is a flow diagram of example operations for wireless communications, in accordance with certain aspects of the present disclosure.

FIG. 10 is a flow diagram of example operations 1000 for wireless communications, in accordance with certain aspects of the present disclosure. The operations 1000 may be performed by an apparatus (e.g., circuit 600, apparatus 700, etc.).

The operations 1000 may begin, at block 1002, by determining a power of a reception signal. The reception signal, for example, can include an RF signal, an IF signal, a baseband signal (e.g., prior to baseband filtering), etc. At block 1004, the apparatus counts, with a first counter, a number of times that the power of the reception signal exceeds a first threshold. At block 1006, the apparatus counts, with a second counter, a number of measurements of the power of the reception signal. At block 1008, the apparatus determines an amount of jamming over a measurement window based on the number of times that the power of the reception signal exceeds the first threshold and on the number of measurements.

In some aspects, the operations 1000 may further include controlling an analog gain of an amplifier circuit based on the amount of jamming over the measurement window. In one aspect, controlling the analog gain may include decreasing the analog gain when the amount of jamming exceeds a second threshold. In one aspect, controlling the analog gain may include increasing the analog gain when the amount of jamming is less than a third threshold.

In some aspects, the operations 1000 may further include (i) counting, with a third counter, a number of times that the power of the reception signal is below a third threshold and (ii) determining an amount of non-jamming over the measurement window, based on the number of times that the power of the reception signal is below the third threshold and on the number of measurements. In these aspects, the operations 1000 may further include controlling the analog gain of the amplifier circuit based on the amount of non-jamming over the measurement window.

In some aspects, the operations 1000 may further include scheduling a command to latch a counter value of at least one of the first counter or the second counter at a first time instance based on an absolute system time, and reading the latched counter value of the at least one of the first counter or the second counter at a second time instance subsequent to the first time instance and prior to a third time instance based on the absolute system time. In these aspects, the measurement window may include a time interval between the first time instance and the third time instance. The latched counter value may be associated with at least one of a type of transmit beam or a gain state for the reception signal.

The various operations of methods described above may be performed by any suitable means capable of performing the corresponding functions. The means may include various hardware and/or software component(s) and/or module (s), including, but not limited to a circuit, an application-specific integrated circuit (ASIC), or processor. Generally, where there are operations illustrated in figures, those operations may have corresponding counterpart means-plus-function components with similar numbering. For example, means for determining a power of a reception signal may include, for example, a power detector circuit (e.g., the power detector circuit 602, 702, 706, 730, 732), etc. Means for counting, with a first counter, a number of times that the power of the reception signal exceeds a first threshold may include, for example, a counter (e.g., the counter 608, 712, 718), etc. Means for counting, with a second counter, a number of measurements of the power of the reception signal may include, for example, a counter (e.g., the counter 606, 714, 720), etc. Means for determining an amount of jamming over a measurement window may include, for example, control logic (e.g., the control logic component 610, 790), etc.

Example Aspects

In addition to the various aspects described above, specific combinations of aspects are within the scope of the disclosure, some of which are detailed below:

Aspect 1: An apparatus for wireless communications, the apparatus comprising: a first counter configured to count a number of times that a power of a reception signal exceeds a first threshold; a second counter configured to count a number of measurements of the power of the reception signal; and control logic having a first input coupled to an output of the first counter and having a second input coupled to an output of the second counter, the control logic being configured to determine an amount of jamming over a measurement window based on the number of times that the power of the reception signal exceeds the first threshold and on the number of measurements.

Aspect 2: The apparatus according to Aspect 1, wherein the control logic is configured to determine the amount of jamming by dividing (i) the number of times that the power of the reception signal exceeds the first threshold by (ii) the number of measurements of the power of the reception signal.

Aspect 3: The apparatus according to any of Aspects 1-2, wherein the amount of jamming comprises at least one of: (i) an amount of time that jamming occurs over the measurement window or (ii) a percentage of jamming over the measurement window.

Aspect 4: The apparatus according to any of Aspects 1-3, further comprising a power detector circuit having an output coupled to an input of the first counter, the power detector circuit being configured to determine the power of the reception signal.

Aspect 5: The apparatus according to Aspect 4, further comprising an amplifier having an output coupled to an input of the power detector circuit, wherein the control logic is configured to generate a logic signal to adjust an analog gain of the amplifier based on the amount of jamming.

Aspect 6: The apparatus according to Aspect 5, further comprising: a frequency synthesizer; and a mixer having a first input coupled to the output of the amplifier, having a second input coupled to an output of the frequency synthesizer, and having an output coupled to the input of the power detector circuit.

Aspect 7: The apparatus according to any of Aspects 5-6, wherein the logic signal is configured to trigger a reduction of the analog gain when the amount of jamming exceeds a second threshold.

Aspect 8: The apparatus according to any of Aspects 5-7, wherein the logic signal is configured to trigger an increase of the analog gain when the amount of jamming is below a second threshold.

Aspect 9: The apparatus according to any of Aspects 4-8, further comprising a comparator having an input coupled to the output of the power detector circuit and having an output coupled to the input of the first counter, the comparator being configured to compare the power of the reception signal to the first threshold and output a digital signal based on the comparison.

Aspect 10: The apparatus according to any of Aspects 1-9, wherein the control logic is further configured to: schedule a command to latch a counter value of at least one of the first counter or the second counter at a first time instance based on an absolute system time; and read the latched counter value of the at least one of the first counter or the second counter at a second time instance subsequent to the first time instance and prior to a third time instance based on the absolute system time.

Aspect 11: The apparatus according to Aspect 10, wherein the measurement window comprises a time interval between the first time instance and the third time instance.

Aspect 12: The apparatus according to any of Aspects 10-11, wherein the latched counter value is associated with at least one of a type of transmit beam or a gain state for the reception signal.

Aspect 13: A wireless device comprising the apparatus according to any of Aspects 1-12, the wireless device further comprising: at least one antenna; an analog-to-digital converter (ADC); and a receive path coupled between the at least one antenna and the ADC, the receive path being configured to generate the reception signal.

Aspect 14: The wireless device according to Aspect 13, wherein the first counter and the second counter are configured to be clocked by a same clock signal and wherein the second counter is configured to increment the number of measurements by one for each rising edge or each falling edge of the clock signal, at least while a portion of the receive path is activated.

Aspect 15: An apparatus for wireless communications, the apparatus comprising: a first power detector circuit coupled to a first receive path and to a second receive path and configured to generate a control signal based on a relative power between: a first reception signal of the first receive path and associated with a first band; and a second reception signal of the second receive path and associated with a second band; a combiner circuit having a first input coupled to the first receive path and having a second input coupled to the second receive path, the combiner circuit being configured to combine the first reception signal and the second reception signal to a single IF path; a second power detector circuit coupled to the single IF path and configured to determine a combined power of the first and second reception signals; a first set of counters coupled to an output of the second power detector circuit, the first set of counters being associated with detecting a jamming of the first band; a second set of counters coupled to the output of the second power detector circuit, the second set of counters being associated with detecting a jamming of the second band; and a selection circuit configured to couple the output of the second power detector circuit to the first or second set of counters based on the control signal.

Aspect 16: The apparatus according to Aspect 15, wherein the first power detector circuit comprises: a third power detector circuit coupled to the first receive path and configured to determine a power of the first reception signal; a fourth power detector circuit coupled to the second receive path and configured to determine a power of the second reception signal; and a comparator configured to compare the power of the first reception signal to the power of the second reception signal and to generate the control signal based on the comparison.

Aspect 17: The apparatus according to any of Aspects 15-16, wherein: the selection circuit is configured to couple the output of the second power detector circuit to the first set of counters when the control signal indicates that a power of the first reception signal is greater than a power of the second reception signal; or the selection circuit is configured to couple the output of the second power detector circuit to the second set of counters when the control signal indicates that the power of the second reception signal is greater than the power of the first reception signal.

Aspect 18: The apparatus according to any of Aspects 15-17, wherein the selection circuit comprises: a first comparator configured to compare the combined power of the first and second reception signals to a first threshold and to generate a first input signal based on the comparison; and a second comparator configured to compare the combined power of the first and second reception signals to a second threshold and to generate a second input signal based on the comparison.

Aspect 19: The apparatus according to Aspect 18, wherein the selection circuit is further configured to activate at least one counter in the first set of counters based on the first input signal or the second input signal, when the output of the second power detector circuit is coupled to the first set of counters.

Aspect 20: The apparatus according to Aspect 19, wherein: the at least one counter in the first set of counters comprises a first counter configured to count a number of times a power of the first reception signal is below the first threshold, when the first input signal indicates that the combined power of the first and second reception signals is below the first threshold; or the at least one counter in the first set of counters comprises a second counter configured to count a number of times the power of the first reception signal exceeds the second threshold, when the second input signal indicates that the combined power of the first and second reception signals exceeds the second threshold.

Aspect 21: The apparatus according to any of Aspects 18-20, wherein the selection circuit is further configured to activate at least one counter in the second set of counters based on the first input signal or the second input signal, when the output of the second power detector circuit is coupled to the second set of counters.

Aspect 22: The apparatus according to Aspect 21, wherein: the at least one counter in the second set of counters comprises a first counter configured to count a number of times a power of the second reception signal is below the first threshold, when the first input signal indicates that the combined power of the first and second reception signals is below the first threshold; or the at least one counter in the second set of counters comprises a second counter configured to count a number of times the power of the second reception signal exceeds a second threshold, when the second input signal indicates that the combined power of the first and second reception signals exceeds the second threshold.

Aspect 23: The apparatus according to any of Aspects 15-22, wherein: the first set of counters comprise: (i) a first counter configured to count a number of times a power of the first reception signal is below a first threshold; (ii) a second counter configured to count a number of times the power of the first reception signal exceeds a second threshold; and (iii) a third counter configured to count a number of measurements of the power of the first reception signal; and the second set of counters comprise: (i) a first counter configured to count a number of times a power of the second reception signal is below the first threshold; (ii) a second counter configured to count a number of times the power of the first reception signal exceeds the second threshold; and (iii) a third counter configured to count a number of measurements of the power of the second reception signal.

Aspect 24: The apparatus according to Aspect 23, further comprising control logic having a first input coupled to an output of the first counter of the first set of counters, having a second input coupled to an output of the second counter of the first set of counters, and having a third input coupled to an output of the third counter of the first set of counters, the control logic being configured to determine at least one of: a first amount of the jamming of the first band over a measurement window, based on the number of times that the power of the first reception signal exceeds the second threshold and the number of measurements of the power of the first reception signal; or a second amount of non-jamming of the first band over the measurement window, based on the number of times that the power of the first reception signal is below the first threshold and the number of measurements of the power of the first reception signal.

Aspect 25: The apparatus according to Aspect 24, wherein the control logic is further configured to: generate a first logic signal to trigger a reduction in an analog gain of an amplifier in the first receive path when the first amount of the jamming of the first band exceeds a third threshold; or generate a second logic signal to trigger an increase in the analog gain when the second amount of non-jamming of the first band exceeds a fourth threshold.

Aspect 26: The apparatus according to any of Aspects 23-25, further comprising control logic having a first input coupled to an output of the first counter of the second set of counters, having a second input coupled to an output of the second counter of the second set of counters, and having a third input coupled to an output of the third counter of the second set of counters, the control logic being configured to determine at least one of: a first amount of the jamming of the second band over a measurement window, based on the number of times that the power of the second reception signal exceeds the second threshold and the number of measurements of the power of the second reception signal; or a second amount of non-jamming of the second band over the measurement window, based on the number of times that the power of the second reception signal is below the first threshold and the number of measurements of the power of the second reception signal.

Aspect 27: The apparatus according to Aspect 26, wherein the control logic is further configured to: generate a first logic signal to trigger a reduction in an analog gain of an amplifier in the second receive path when the first amount of the jamming of the second band exceeds a third threshold; or generate a second logic signal to trigger an increase in the analog gain when the second amount of non-jamming of the second band exceeds a fourth threshold.

Aspect 28: A method for wireless communications, the method comprising: determining a power of a reception signal; counting, with a first counter, a number of times that the power of the reception signal exceeds a first threshold; counting, with a second counter, a number of measurements of the power of the reception signal; and determining an amount of jamming over a measurement window based on the number of times that the power of the reception signal exceeds the first threshold and on the number of measurements.

Aspect 29: The method according to Aspect 28, further comprising controlling an analog gain of an amplifier circuit based on the amount of jamming over the measurement window.

Aspect 30: The method according to Aspect 29, wherein controlling the analog gain comprises: decreasing the analog gain when the amount of jamming exceeds a second threshold; or increasing the analog gain when the amount of jamming is less than a third threshold.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules, and circuits described in connection with the present disclosure may be implemented or performed with discrete hardware components designed to perform the functions described herein.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, the apparatus comprising:
  a jamming detection circuit disposed prior to an analog baseband filter, the jamming detection circuit comprising:
    a first counter configured to count a number of times that a power of a reception signal exceeds a first threshold;
    a second counter configured to count a number of measurements of the power of the reception signal; and
    control logic having a first input coupled to an output of the first counter and having a second input coupled to an output of the second counter, the control logic being configured to:
      obtain a first plurality of counter values of the first counter and a second plurality of counter values of the second counter, each counter value of the first plurality of counter values indicating a respective number of times that the power of the reception signal exceeds the first threshold during a respective time interval of a measurement window, and each counter value of the second plurality of counter values indicating a respective number of measurements of the power of the reception signal during the respective time interval of the measurement window;
      determine at least one of the respective time intervals is associated with at least one of (i) a transition from a first type of transmit beam to a second type of transmit beam for the reception signal or (ii) a transition from a first gain state to a second gain state for the reception signal;
      responsive to the determination, determine an amount of jamming over the measurement window based on a subset of the first plurality of counter values and on a subset of the second plurality of counter values, wherein at least one of the subset of the first plurality of counter values is smaller than the first plurality of counter values or the subset of the second plurality of counter values is smaller than the second plurality of counter values; and
      adjust an analog gain of an amplifier based on the amount of jamming.

2. The apparatus of claim 1, wherein the control logic is configured to determine the amount of jamming by dividing (i) a sum of the subset of the first plurality of counter values by (ii) a sum of the subset of the second plurality of counter values.

3. The apparatus of claim 1, wherein the amount of jamming comprises at least one of: (i) an amount of time that jamming occurs over the measurement window or (ii) a percentage of jamming over the measurement window.

4. The apparatus of claim 1, wherein the jamming detection circuit further comprises a power detector circuit having an output coupled to an input of the first counter, the power detector circuit being configured to determine the power of the reception signal.

5. The apparatus of claim 4, further comprising the amplifier, wherein the amplifier has an output coupled to an input of the power detector circuit, wherein the control logic is configured to generate a logic signal to adjust the analog gain of the amplifier based on the amount of jamming.

6. The apparatus of claim 5, further comprising:
  a frequency synthesizer; and
  a mixer having a first input coupled to the output of the amplifier, having a second input coupled to an output of the frequency synthesizer, and having an output coupled to the input of the power detector circuit.

7. The apparatus of claim 5, wherein the logic signal is configured to trigger a reduction of the analog gain when the amount of jamming exceeds a second threshold.

8. The apparatus of claim 5, wherein the logic signal is configured to trigger an increase of the analog gain when the amount of jamming is below a second threshold.

9. The apparatus of claim 4, wherein the jamming detection circuit further comprises a comparator having an input coupled to the output of the power detector circuit and having an output coupled to the input of the first counter, the comparator being configured to compare the power of the reception signal to the first threshold and output a digital signal based on the comparison.

10. The apparatus of claim 1, wherein the control logic is further configured to:
  schedule a command to latch at least a first counter value of the first plurality of counter values and a second counter value of the second plurality of counter values at a first time instance based on an absolute system time; and
  read the latched first counter value and the latched second counter value at a second time instance subsequent to the first time instance based on the absolute system time.

11. A wireless device comprising the apparatus of claim 1, the wireless device further comprising:
  at least one antenna;
  an analog-to-digital converter (ADC); and
  a receive path coupled between the at least one antenna and the ADC and comprising the analog baseband filter, a portion of the receive path being configured to generate the reception signal.

12. The wireless device of claim 11, wherein the first counter and the second counter are configured to be clocked by a same clock signal and wherein the second counter is configured to increment the number of measurements by one for each rising edge or each falling edge of the clock signal, at least while the portion of the receive path is activated.

13. The apparatus of claim 1, wherein:
  the control logic is further configured to discard at least one of the first plurality of counter values and at least one of the second plurality of counter values associated with the at least one of the respective time intervals associated with the at least one of (i) the transition from the first type of transmit beam to the second type of transmit beam for the reception signal or (ii) the transition from the first gain state to the second gain state for the reception signal;
the subset of the first plurality of counter values lacks the discarded at least one of the first plurality of counter values; and
the subset of the second plurality of counter values lacks the discarded at least one of the second plurality of counter values.

14. A method for wireless communications, the method comprising:
prior to filtering a reception signal via an analog baseband filter:
determining a power of the reception signal;
counting, with a first counter, a number of times that the power of the reception signal exceeds a first threshold;
counting, with a second counter, a number of measurements of the power of the reception signal;
obtaining a first plurality of counter values of the first counter and a second plurality of counter values of the second counter, each counter value of the first plurality of counter values indicating a respective number of times that the power of the reception signal exceeds the first threshold during a respective time interval of a measurement window, and each counter value of the second plurality of counter values indicating a respective number of measurements of the power of the reception signal during the respective time interval of the measurement window;
determining at least one of the respective time intervals is associated with at least one of (i) a transition from a first type of transmit beam to a second type of transmit beam for the reception signal or (ii) a transition from a first gain state to a second gain state for the reception signal;
responsive to the determination, determining an amount of jamming over the measurement window based on a subset of the first plurality of counter values and on a subset of the second plurality of counter values, wherein at least one of the subset of the first plurality of counter values is smaller than the first plurality of counter values or the subset of the second plurality of counter values is smaller than the second plurality of counter values; and
adjusting an analog gain of an amplifier circuit based on the amount of jamming over the measurement window.

15. The method of claim 14, further comprising generating a logic signal to adjust the analog gain of the amplifier circuit based on the amount of jamming.

16. The method of claim 14, wherein adjusting the analog gain comprises decreasing the analog gain when the amount of jamming exceeds a second threshold.

17. The method of claim 14, wherein adjusting the analog gain comprises increasing the analog gain when the amount of jamming is less than a second threshold.

18. The method of claim 14, wherein the amount of jamming comprises at least one of: (i) an amount of time that jamming occurs over the measurement window or (ii) a percentage of jamming over the measurement window.

19. The method of claim 14, further comprising discarding at least one of the first plurality of counter values and at least one of the second plurality of counter values associated with the at least one of the respective time intervals associated with the at least one of (i) the transition from the first type of transmit beam to the second type of transmit beam for the reception signal or (ii) the transition from the first gain state to the second gain state for the reception signal, wherein:
the subset of the first plurality of counter values lacks the discarded at least one of the first plurality of counter values; and
the subset of the second plurality of counter values lacks the discarded at least one of the second plurality of counter values.

20. A wireless device comprising:
a receive path, wherein at least a portion of the receive path is configured to generate a reception signal, the receive path comprising:
an amplifier;
an analog baseband filter; and
a jamming detection circuit having an input coupled to an output of the amplifier before an input of the analog baseband filter in the receive path, the jamming detection circuit comprising:
a first counter configured to count a number of times that a power of the reception signal exceeds a first threshold;
a second counter configured to count a number of measurements of the power of the reception signal; and
control logic having a first input coupled to an output of the first counter and having a second input coupled to an output of the second counter, the control logic being configured to:
obtain a first plurality of counter values of the first counter and a second plurality of counter values of the second counter, each counter value of the first plurality of counter values indicating a respective number of times that the power of the reception signal exceeds the first threshold during a respective time interval of a measurement window, and each counter value of the second plurality of counter values indicating a respective number of measurements of the power of the reception signal during the respective time interval of the measurement window;
determine at least one of the respective time intervals is associated with at least one of (i) a transition from a first type of transmit beam to a second type of transmit beam for the reception signal or (ii) a transition from a first gain state to a second gain state for the reception signal;
responsive to the determination, determine an amount of jamming over the measurement window based on a subset of the first plurality of counter values and on a subset of the second plurality of counter values, wherein at least one of the subset of the first plurality of counter values is smaller than the first plurality of counter values or the subset of the second plurality of counter values is smaller than the second plurality of counter values; and
adjust an analog gain of the amplifier based on the amount of jamming.

21. The wireless device of claim 20, further comprising:
at least one antenna; and
an analog-to-digital converter (ADC), wherein the receive path is coupled between the at least one antenna and the ADC.

22. The wireless device of claim 20, wherein the amount of jamming comprises at least one of: (i) an amount of time that jamming occurs over the measurement window or (ii) a percentage of jamming over the measurement window.

23. The wireless device of claim 20, wherein the jamming detection circuit further comprises a power detector circuit having an output coupled to an input of the first counter, the power detector circuit being configured to determine the power of the reception signal.

24. The wireless device of claim 23, wherein the jamming detection circuit further comprises a comparator having an input coupled to the output of the power detector circuit and having an output coupled to the input of the first counter, the comparator being configured to compare the power of the reception signal to the first threshold and output a digital signal based on the comparison.

25. The wireless device of claim 20, wherein, in order to adjust the analog gain of the amplifier, the control logic is configured to generate a logic signal configured to trigger a reduction of the analog gain when the amount of jamming exceeds a second threshold.

26. The wireless device of claim 20, wherein, in order to adjust the analog gain of the amplifier, the control logic is configured to generate a logic signal to trigger an increase of the analog gain when the amount of jamming is below a second threshold.

27. The wireless device of claim 20, wherein the control logic is further configured to:
schedule a command to latch at least a first counter value of the first plurality of counter values and a second counter value of the second plurality of counter values at a first time instance based on an absolute system time; and
read the latched first counter value and the latched second counter value at a second time instance subsequent to the first time instance and prior to a third time instance based on the absolute system time.

28. The wireless device of claim 20, wherein the first counter and the second counter are configured to be clocked by a same clock signal and wherein the second counter is configured to increment the number of measurements by one for each rising edge or each falling edge of the clock signal, at least while the at least the portion of the receive path is activated.

29. The wireless device of claim 20, wherein:
the control logic is further configured to discard at least one of the first plurality of counter values and at least one of the second plurality of counter values associated with the at least one of the respective time intervals associated with the at least one of (i) the transition from the first type of transmit beam to the second type of transmit beam for the reception signal or (ii) the transition from the first gain state to the second gain state for the reception signal;
the subset of the first plurality of counter values lacks the discarded at least one of the first plurality of counter values; and
the subset of the second plurality of counter values lacks the discarded at least one of the second plurality of counter values.

* * * * *